United States Patent [19]

Ikeda et al.

[11] Patent Number: 5,757,384
[45] Date of Patent: May 26, 1998

[54] APPARATUS AND METHOD FOR FONT THINNING AND BOLDING BASED UPON FONT OUTLINE

[75] Inventors: Nobuyuki Ikeda; Hiroshi Sakurai; Yoshito Kobayashi; Toshinori Otsuka; Hirokazu Yamamoto, all of Kanagawa, Japan

[73] Assignee: Mitsubishi Denki Kabushiki Kaisha, Tokyo, Japan

[21] Appl. No.: 892,832

[22] Filed: Jul. 15, 1997

Related U.S. Application Data

[63] Continuation of Ser. No. 461,306, Jun. 5, 1995, abandoned.

[30] Foreign Application Priority Data

Aug. 19, 1994 [JP] Japan ................... 6-195596

[51] Int. Cl.⁶ .................................................. G06F 3/14
[52] U.S. Cl. ........................ 345/468; 345/144; 345/470
[58] Field of Search .......................... 395/805, 167–172; 345/141, 142, 143, 144

[56] References Cited

U.S. PATENT DOCUMENTS

| | | | |
|---|---|---|---|
| 4,897,638 | 1/1990 | Kokunishi et al. | 345/142 |
| 5,099,435 | 3/1992 | Collins et al. | 395/150 |
| 5,148,519 | 9/1992 | Ishii | 395/141 |
| 5,222,208 | 6/1993 | Matsuhira | 395/150 |
| 5,280,576 | 1/1994 | Cao | 395/150 |
| 5,293,477 | 3/1994 | Matoba | 395/151 |
| 5,295,240 | 3/1994 | Kajimoto | 395/151 |
| 5,325,479 | 6/1994 | Kaasila | 395/151 |
| 5,398,306 | 3/1995 | Karow | 395/110 |
| 5,398,311 | 3/1995 | Seto | 395/151 |
| 5,459,828 | 10/1995 | Zack et al. | 395/151 |
| 5,471,568 | 11/1995 | Webb et al. | 395/133 |
| 5,473,743 | 12/1995 | Watanabe | 395/171 |
| 5,475,809 | 12/1995 | Sato | 395/151 |
| 5,499,332 | 3/1996 | Yoshida | 395/150 |

FOREIGN PATENT DOCUMENTS

| | | |
|---|---|---|
| 1-270186 | 4/1988 | Japan . |
| 2-93496 | 9/1988 | Japan . |
| 5-19740 | 7/1991 | Japan . |

*Primary Examiner*—Joseph H. Feild
*Assistant Examiner*—Stephen Hong
*Attorney, Agent, or Firm*—Wolf, Greenfield & Sacks, P.C.

[57] ABSTRACT

This invention offers a font processor which performs thinning processing, standard processing and bolding processing in outline font according to a resolution level of an output apparatus. According to this invention, a rasterizer generates a raster image in a first area from the outline font, which is stored in a font memory. An outline producer produces an outline image in a second area according to an outline width, which is determined by an outline width determiner. An operation unit makes an logical operation of the raster image and the outline image, and generates an thinned or bolded raster image.

38 Claims, 48 Drawing Sheets

(b) Outline image (a) Raster image

Leave an area which is "OFF" in 2nd area and "ON" in 1st area in 1st area
(White = "OFF", Black = "ON")

(c) Thinned raster image

Fig.7 Outline Width according to Display Size & Typeface

Display size 44 point

Display size 11 point

Display size 10 point

Display size 8 point

| Typeface | |
|---|---|
| Gothic | w = 1 dot |
| Bold | w = 3 dot |
| Ming-cho | w = 1 dot |
| Typeface created by user 1 | w = 3 dot |
| Typeface created by user 2 | w = 1 dot |
| Typeface created by user 3 | w = 7 dot |

Fig.8

Modifying Value of Outline for Character Types

| Type | Modifying val. m |
|---|---|
| English | +1 dot |
| Number | +2 dot |
| Katakana | +1 dot |
| Hiragana | +1 dot |
| Kanji | −2 dot |
| Symbol 1 (simple) | +2 dot |
| Symbol 2 (complex) | −2 dot |
| Figure 1 (simple) | +2 dot |
| Figure 2 | 0 dot |
| Figure 3 (complex) | −2 dot |

Thinning Processing / Bolding Processing

Flow Chart of Font Extension · Display

Fig.27

```
if ( Resolution of device < 300 dpi or
    Resolution of device > 1000 dpi )

Thinning processing or bolding processing else

Standard font extension
```

Fig.30
2nd area
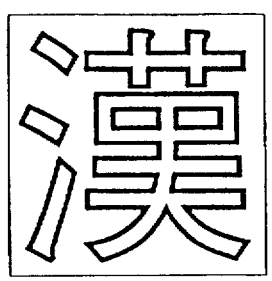
(b) Outline image
1st area
(a) Bolder raster image
Leave an area which is "OFF" in 2nd area and "ON" in 1st area in 1st area
$\begin{pmatrix} \text{White = "OFF"} \\ \text{Black = " ON"} \end{pmatrix}$
1st area
(c) Thinned raster image

Fig.46 RELATED ART
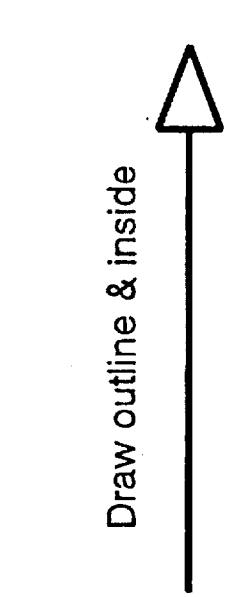
(a) Draw outline
Draw outline & inside →
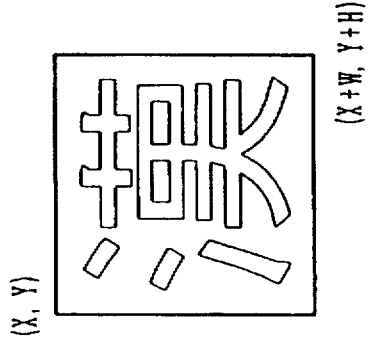
(b) Rasterize inside

Fig.47
RELATED ART

| 仕　様　表 | |
|---|---|
| セット形名 | MSZ |
| 性能 | 冷房 | 冷房性能 | kW |
| | | 定格消費電力 | W |
| | | 運転電流 | A |
| | | 力率 | % |
| | | 始動電流 | A |
| | 暖房 | 暖房性能 | W |
| | | 定格消費電力 | W |
| | | 低温性能 | kW |
| | | 低温消費電力 | W |
| | | 運転電流 | A |
| | | 力率 | % |
| | | 始動電流 | A |

Sample of Thinning Processing according to the Related Art

APPARATUS AND METHOD FOR FONT THINNING AND BOLDING BASED UPON FONT OUTLINE

This application is a Continuation of application Ser. No. 08/461,306, filed Jun. 5, 1995 now abandoned.

BACKGROUND OF THE INVENTION

1. Field of the Invention

This invention relates to a processing system of character patterns. This invention mainly relates to thinning processing and bolding processing of character patterns which are outputted to a display unit and a printer.

2. Description of the Related Art

Concerning font types of displaying characters, there are mainly two types: a dot font and an outline font.

According to the dot font, character patterns are outputted in sets of dots. When characters according to the dot font are magnified or reduced in size, a quality of the characters drops. Therefore, in some cases, a different font is provided for each of character sizes to avoid such inconvenience.

According to the outline font, outlines of the characters are defined with drawing elements such as a straight line, arc, curve, etc. According to the outline font, a character is able to be magnified, reduced, turned and transformed freely. Therefore, if a typeface of the characters is same, the characters in various sizes are able to be produced from a font according to the outline font. Consequently, the outline font has an advantage of outputting the characters in various sizes with a small memory volume.

A rasterizing process according to the related art to display a character of the outline font on a display unit is explained in reference with FIGS. 42–48.

FIG. 42 is a flow chart of the rasterizing process according to the related art. The flow chart starts with a step of receiving a character code of a displaying character, a size of the displaying character and a display position in the display screen. In step S10, the size of the displaying character and the display position of the character are obtained. In step S11, an outline font information of the displaying character is loaded. In step S12, coordinate value for drawing outlines is gotten from a vector data of the outline font (see FIG. 43).

In step S13, conversion matrixes such as scaling, turning, italic, etc. are applied for the coordinate value for drawing the outlines. In step S14, the coordinate value for drawing the outlines is converted to a value within a display range in size. In (a) of FIG. 44, coordinate value for drawing an outline of a character of "漢 (KAN)" is within a range of a square defined with coordinate value (0,0) and coordinate value (8191, 8191). This original data is converted to a value within a display size. As a result, the character of "漢 (KAN)" is converted and displayed within a range of coordinate values of (0,0) and (W, H), as shown in (b) of FIG. 44. Generally, the original data is reduced.

In step S15, the coordinate value for drawing the outline is shifted to a position to start drawing the character. When the character is displayed on a display unit, etc., the position to start drawing the character is a position where the character is displayed in a screen. For example, in FIG. 45, when the position to start drawing a character is shifted from the coordinate value shown in (a) of FIG. 45 to the coordinate value of (X, Y), the coordinates value for drawing the character is converted to the coordinate value which is shown in (b) of FIG. 45. Consequently, the coordinate value for drawing the outline of "漢 (KAN)" becomes within the range of a square defined with coordinate value (X, Y) and coordinate value (X+W, Y+H). In step S16, the outline is drawn. As shown in (a) of FIG. 46, the outline of the character "漢 (KAN)" is drawn within a range which is defined with coordinate value (X, Y) and coordinate value (X+W, Y+H). In step S17, an inside of the outline is rasterized. As shown in (b) of FIG. 46, the inside of the character "漢 (KAN)" is rasterized. This is the flow of the rasterizing process according to the related art.

As stated, the vector data is converted to a dot pattern in a designated size, and displayed at a designated position.

When a character is outputted to an output apparatus with a high resolution level, a character according to the outline font and a character according to the dot font are outputted almost in a same quality. However, when the character according to the dot font is outputted to an output apparatus with a low resolution level, the character has been outputted beautifully by using the dot pattern which is modified for each of the resolution levels of the output apparatuses.

Meanwhile, the character according to the outline font is able to be outputted beautifully in both the output apparatus with a high resolution level and the output apparatus with a low resolution level. However, when a character according to the outline font is outputted to an output apparatus with a low resolution level or a character according to the outline font is outputted in a small size, the outlines are overlapped as shown in FIG. 47. The overlapped characters become a lump, and they become hard to be read. This problem is able to be solved by thinning the lines which constitute the characters.

According to a related method of thinning, another set of character font information with thinned lines is provided. According to another related method of thinning, a conjunction of a character pattern and a pattern which is shifted horizontally in one dot from the original position of the character pattern is used. This method is applied to a dot image.

Additionally, a method to display a character pattern with thinner lines only horizontally is described in Unexamined Published Japanese Patent Application Hei 01-270186. This method is shown in FIG. 48. According to this method, thinning processing is performed within a display unit before displaying the character pattern. When a character has only one dot horizontally, thinning processing is not performed. When a character has 2 or more dots horizontally, thinning processing is performed by deleting one dot.

According to the method to provide a set of thinned character font information, a thinned character font memory had to be provided. Consequently, a cost was increased.

According to the method to use a conjunction of a character pattern and a pattern which is shifted horizontally in one dot from the original character pattern, if a character has many vertical strokes, a line in one dot vertically disappeared.

According to the method to display a character pattern with thinner lines only horizontally, thinning processing is performed within the display unit. Therefore, this method was unable to be applied to many kinds of output apparatuses with a low resolution level, e.g., a facsimile, etc.

When a character is outputted to an output apparatus with a high resolution level, e.g., a printer, etc. the character is occasionally preferred to be outputted in bolder lines than usual. On the contrary, when the character is outputted to an output apparatus with a low resolution level, e.g., a facsimile, etc., thinning processing is necessary.

When characters are outputted to many kinds of output apparatuses, it is requested that line width of the characters is modified to an optimal width, and distributed to each of the output apparatuses automatically.

SUMMARY OF THE INVENTION

This invention intends to solve the above-stated problems in the related art. This invention aims at offering a font processor and a font processing method to perform one of thinning processing, standard processing and bolding processing selectively based on the resolution levels of the output apparatuses according to the outline font.

This invention also aims at offering a font processor and a font processing method to distribute the characters for which one of thinning processing, standard processing and bolding processing is performed based on the resolution level of each of the output apparatuses.

According to one aspect of this invention, a font processor comprising a font memory for storing outline font information; a width indicator for indicating a line width of an outline, an outline producer, coupled to the font memory and the width indicator, for producing an outline image with the indicated line width according to the outline font information, a font generator, coupled to the outline producer, for generating a font image based on the outline image, and an output mechanism, coupled to the font generator, for outputting the font image.

According to another aspect of this invention, a font processor comprising a font memory for storing outline font information, a rasterizer, coupled to the font memory, for producing an outline according to the outline font information and for converting the outline to a raster image which includes the outline and an inside area of the outline, a width indicator for indicating a line width of the outline, an outline producer, coupled to the width indicator, for producing an outline image with the indicated line width according to the outline font information, a processing unit, coupled to the outline producer and the rasterizer, for processing the raster image with the outline image so as to modify the raster image to create a modified raster image, and an output mechanism, coupled to the processing unit, for outputting the modified raster image.

According to another aspect of this invention, a font processor comprising a font memory for storing outline font information; a width indicator for indicating a line width of an outline, an outline producer, coupled to the font memory and the width indicator for producing an outline image with the indicated line width according to the outline font information, a bold line producer, coupled to the outline producer, for producing a raster image based on the outline image, the raster image including the outline image and an inside area of the outline image, a processing unit for processing the raster image with the outline image so as to modify the raster image to create a modified raster image, and an output mechanism, coupled to the processing unit, for outputting the modified raster image.

According to another aspect of this invention, a font processor comprising a font memory for storing outline font information, a width indicator for indicating a line width of an outline, an outline producer, coupled to the font memory and the width indicator, for producing an outline image with the indicated line width according to the outline font information, an exclusive image producer, coupled to the outline producer, for producing an exclusive image which includes the outline image and an outside area of the outline, a rasterizer, coupled to the exclusive image producer, for excluding the exclusive image from a predefined area so as to produce a raster Image; and output mechanism, coupled to the rasterizer, for outputting the raster image produced by the rasterizer.

According to another aspect of this invention, a font processor comprising a font memory for storing outline font information, a width indicator for indicating a line width of an outline, an outline producer, coupled to the font memory and the width indicator, for producing an outline image with the indicated line width according to the outline font information, a bold line producer, coupled to the outline producer, for producing a raster image based on the outline image, the raster image including the outline image and an inside area of the outline image, and an output mechanism, coupled to the bold line producer, for outputting the raster image produced by the bold line producer.

According to another aspect of this invention, a font processing method for creating a modified raster image comprises the steps of producing an outline based on outline font information and rasterizing the outline and an inside area of the outline to produce a raster image, producing an outline Image with an outline width based on the outline font information, and modifying the raster image with the outline image by performing a predefined operation, to create the modified raster image.

According to another aspect of this invention, a font processing method for creating a modified raster image comprises the steps of producing an outline image with an outline width based on outline font information, producing a raster image from the outline image and an inside area of the outline image, and modifying the raster Image with the outline image by performing a predefined operation to create the modified raster image.

According to another aspect of this invention, a font processing method for producing a raster image, comprises the steps of producing an outline image with an outline width based on outline font information, producing an exclusive image from the outline image and an outside area of the outline image, and producing the raster image by eliminating the exclusive image for a predefined area.

BRIEF EXPLANATION OF THE DRAWINGS

In the drawings.

FIG. 7 shows the outline widths based on the display size and the typeface in an embodiment of this invention;

FIG. 8 shows modifying values of the outline widths according to a character type in an embodiment of this invention;

FIG. 27 shows a sample of a judgement based on the resolution level in an embodiment of this invention;

FIG. 30 illustrates a concept of thinning processing in an embodiment of this invention;

FIG. 46 explains rasterizing according to the related art;

FIG. 47 shows a sample of displaying characters for a display unit with a low resolution level.

DESCRIPTION OF THE PREFERRED EMBODIMENTS

Embodiment 1.

An example of thinning methods of a font processor is explained in embodiment 1.

Figure 1:
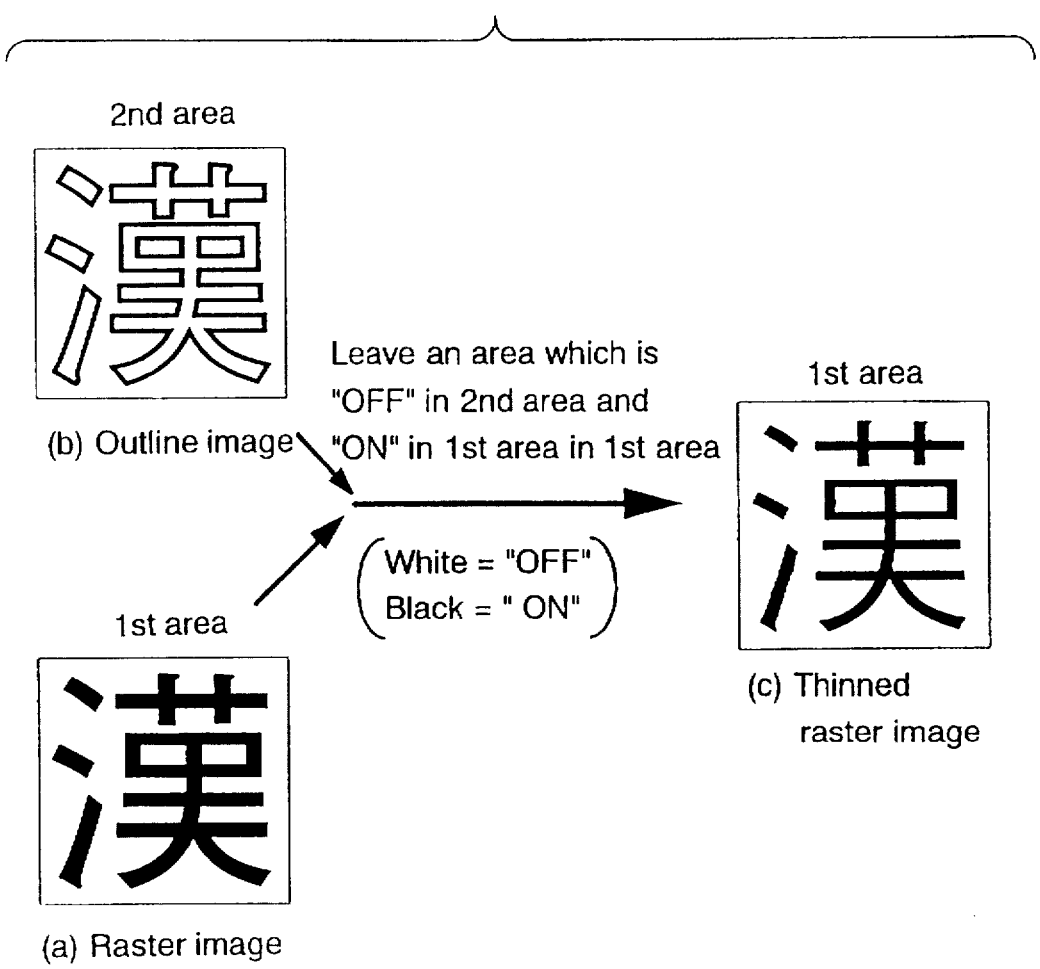
FIG. 1 illustrates a concept of thinning processing in an embodiment of this invention.

A concept of the thinning method of embodiment 1 is illustrated in FIG. 1. In FIG. 1, a raster image of character " 漢 (KAN)" is illustrated in (a). It is same with a character which is produced by a rasterizing method according to the related art. An outline image of the character " 漢 (KAN)" is illustrated in (b). It has a bolder outline than an outline character which is used in the rasterizing method according to the related art. A thinned raster image is illustrated in (c). The thinned raster image is generated by leaving an area which is white in the outline image and black in the raster image.

According to the thinning method in embodiment 1, the raster image and the outline image of a character are generated, and the thinned image of the character is generated from the raster image and the outline image.

Figure 2:
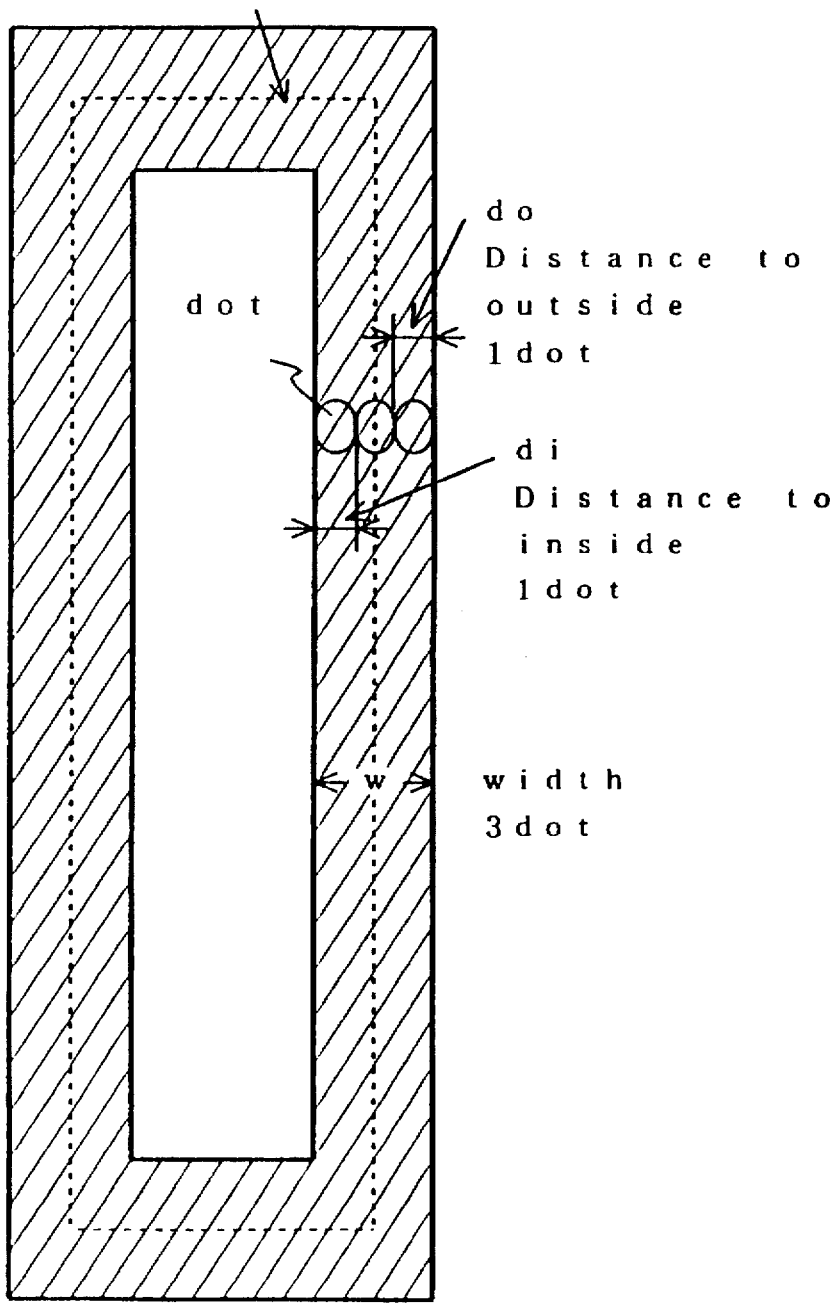
FIG. 2 is an explanatory illustration of a width of an outline in this invention.

In FIG. 2, a line width of an outline of an outline image is defined.

For explanation, a sign "l" is used. According the rasterizing method which is stated in the related art, an outline of "l" is a dotted line which is shown in FIG. 2. The width of the dotted line is 1 dot. The outline image of "l" is shown in a shade between two solid lines along the dotted line. In FIG. 2, the outline was made bolder by one dot both inside and outside from the original outline. Each of circles in the shade is a dot.

In FIG. 2, "do" is a distance from the original outline to the outside solid line, which is one dot in this example. In FIG. 2, "di" is a distance from the original outline to the inside solid line, which is also one dot in this example. A bolder line width of the outline character is shown as "w", and w=do+di+1.

In the embodiments hereinafter, an outline width means "w." The line width of the outline may also be defined by using either "do" or "di." An advantage of using "w" as the outline width is that "w" is also able to be applied to the definition of the outline width in bolding processing which is stated later.

When the original outline is made bolder by one dot both inside and outside, "w" becomes 3 dots. When the original outline is made bolder by 0, 1, 2, 3, . . . , dots both inside and outside, the outline width w becomes w=1, 3, 5, 7, . . . The "w" is a positive odd integer. The outline width is preferred to be an odd number. If the outline width is an odd number, the distances from the original outline to both inside and outside lines are always able to be defined. If the outline width is an even number, it might become difficult to determine either inside and outside of the original outline is made bolder. Or, either inside or outside of the original outline is made bolder, and an unusually-looking character might be produced.

When w=3 dots, 2 dots out of 3 dots are deleted, according to thinning processing of this embodiment. The deletion is made by 2 dots×2=4 dots both horizontally and vertically.

When w=1, 1 dot×2=2 dots are deleted in this thinning processing.

Figure 3:
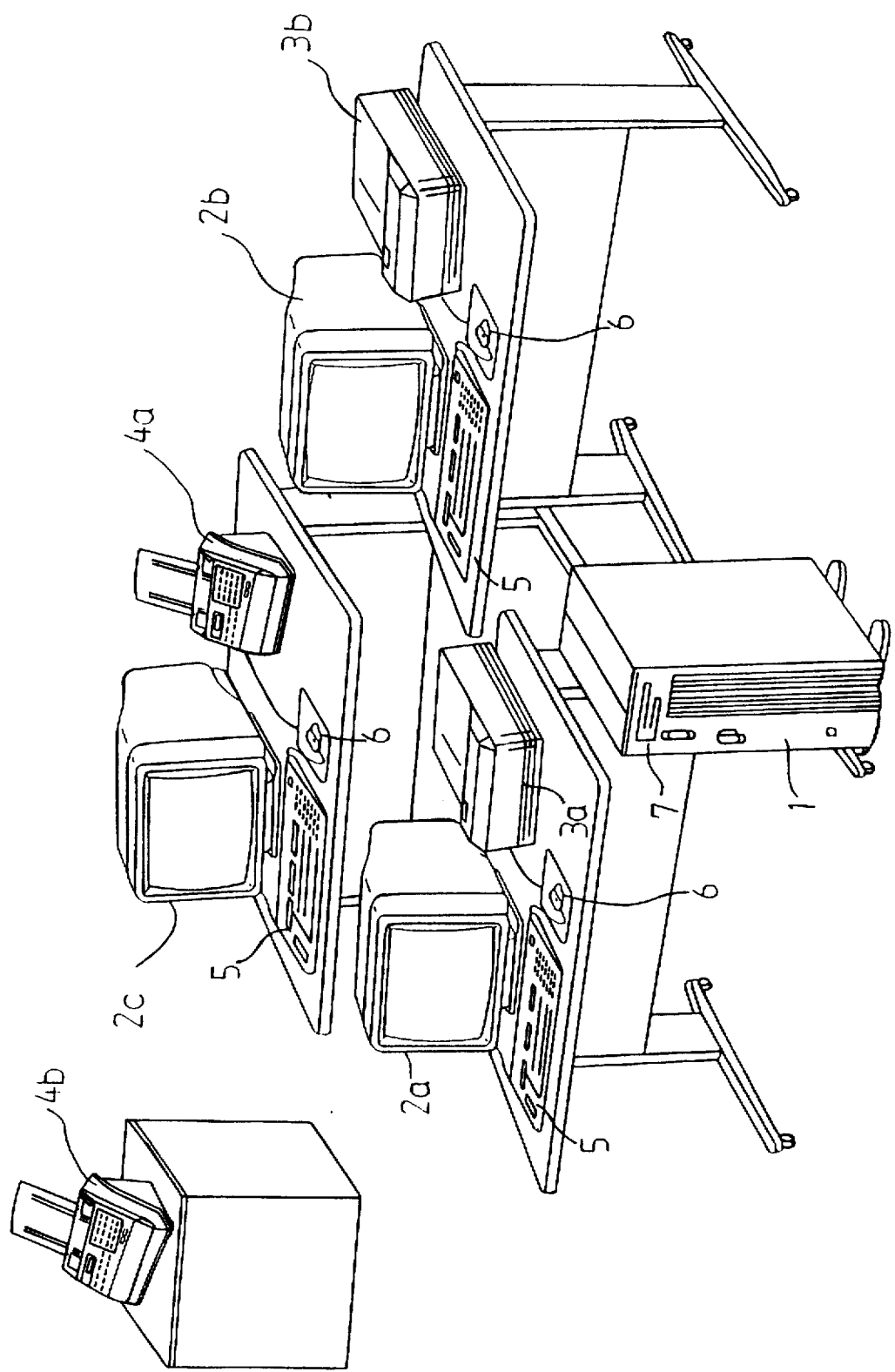
FIG. 3 shows a hardware configuration in this invention.

A hardware configuration of embodiment 1 is illustrated in FIG. 3. In FIG. 3, CPU 1, display units 2a–2c, printers 3a–3c, facsimiles 4a–4d, a keyboard 5, a mouse 6 and a disk drive 7 are illustrated.

In this case, as an example, the display unit 2a has a resolution level of 300 dpi, the display unit 2b has a resolution level of 600 dpi, and the display unit 2c has a resolution level of 150 dpi. The printer 3a has a resolution level of 1200 dpi, and the printer 3b has a resolution level of 800 dpi. The facsimile 4a has a resolution level of 600 dpi, and the facsimile 4b has a resolution level of 200 dpi.

Figure 4:
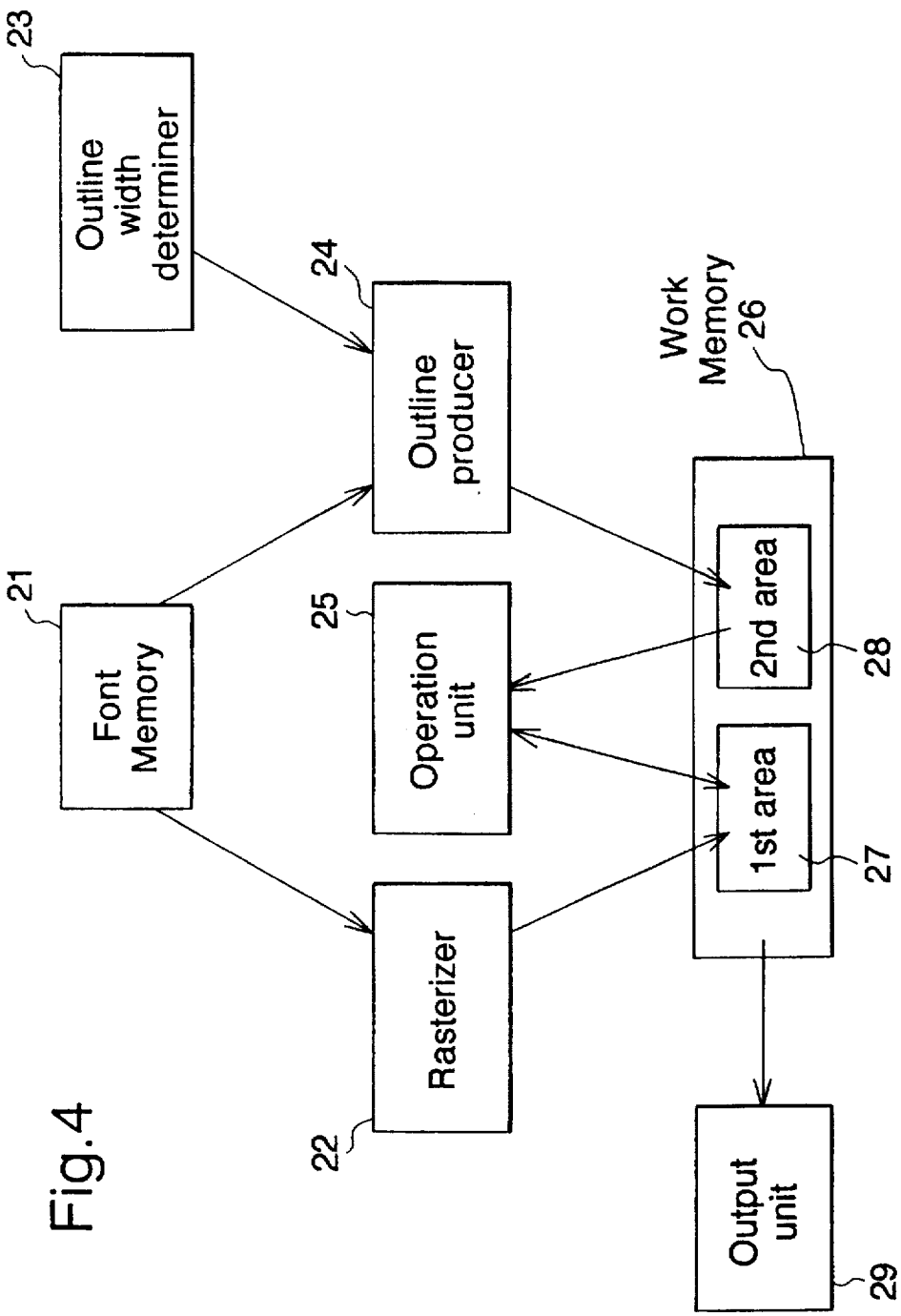
FIG. 4 is a block chart of an embodiment of this invention.

FIG. 4 is a block chart of embodiment 1. In FIG. 4, a font memory 21, which stores outline font information, and a rasterizer 22 are shown. The rasterizer 22 produces an outline character based on the outline font information (vector data) which is stored in the font memory 21, and generates a raster image by rasterizing an inside of the outline character. Hereinafter, the term "rasterizing" is used to mean converting vector data which defines an outline of a character to a bit map image which consists of dots.

An outline width determiner 23 determines an outline width w of an outline character, in case that the outline should be made bolder. An outline producer 24 produces an outline image based on the outline font information which is stored in the font memory 21 and the outline width w which is determined by the outline width determiner 23.

An operation unit 25 makes a predefined logical operation with a raster image, which is generated by the rasterizer 22, and an outline image, which is produced by the outline producer 24, and generates a thinned raster image.

A work memory 26 is provided. A first area 27 in the work memory 26 are also shown. The first area 27 is an area where the raster image which is generated by the rasterizer 22 and the operation unit 25 is stored temporarily. In a second area 28 in the work memory 26, the outline image which is produced in the outline producer 24 is stored temporarily.

An output unit 29 outputs the raster image, which is processed and generated by the operation unit 25, from the work memory 26.

Figure 5:
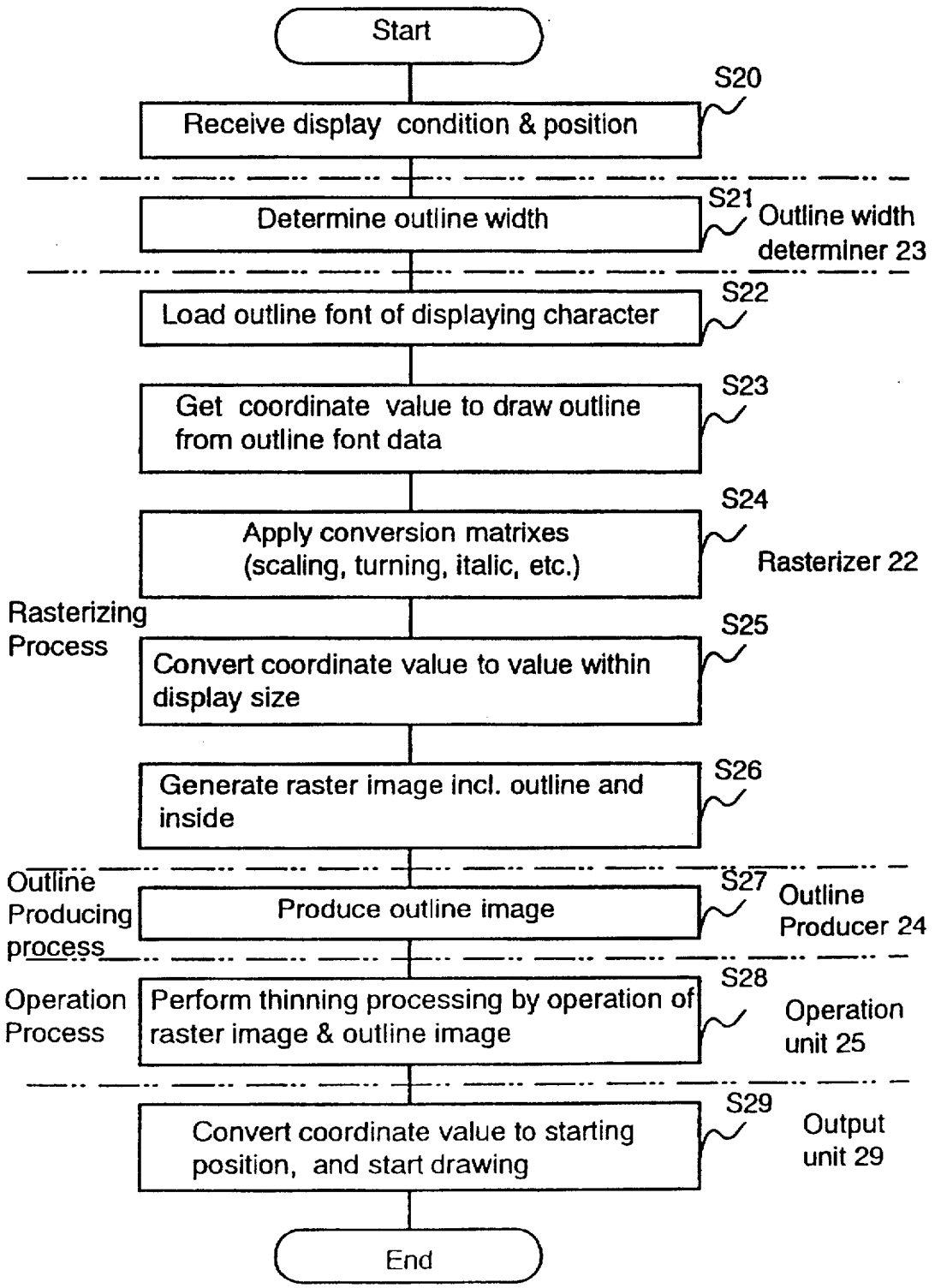
FIG. 5 shows a flow of thinning processing in an embodiment of this invention.

FIG. 5 is a flow chart of thinning processing which is performed in the font processor of embodiment 1. This flow chart starts with a step to receive a character code of a displaying character, a display condition and a display position on a display screen.

In step S20, the display condition of a character and the display position are obtained. The display condition is a display size, typeface, character type, resolution level, and value which is defined by a user. The display condition is used in step S21 when the outline width is determined.

In step S21, the outline determiner 23 determines the outline width w based on the display size, typeface, character type, resolution level and value which is defined by the user.

Figure 42:
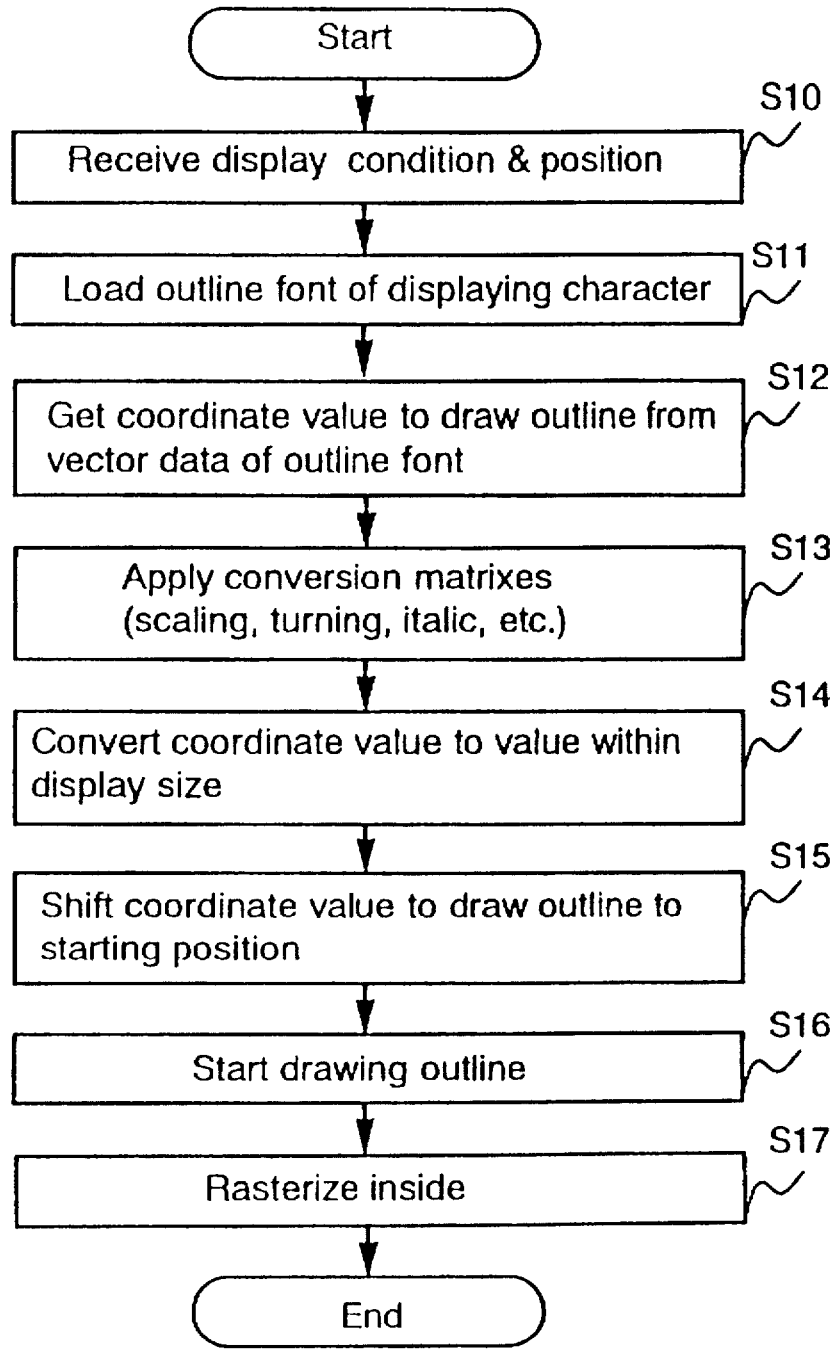
FIG. 42 shows a flow of rasterizing according to the related art.
Figure 43:
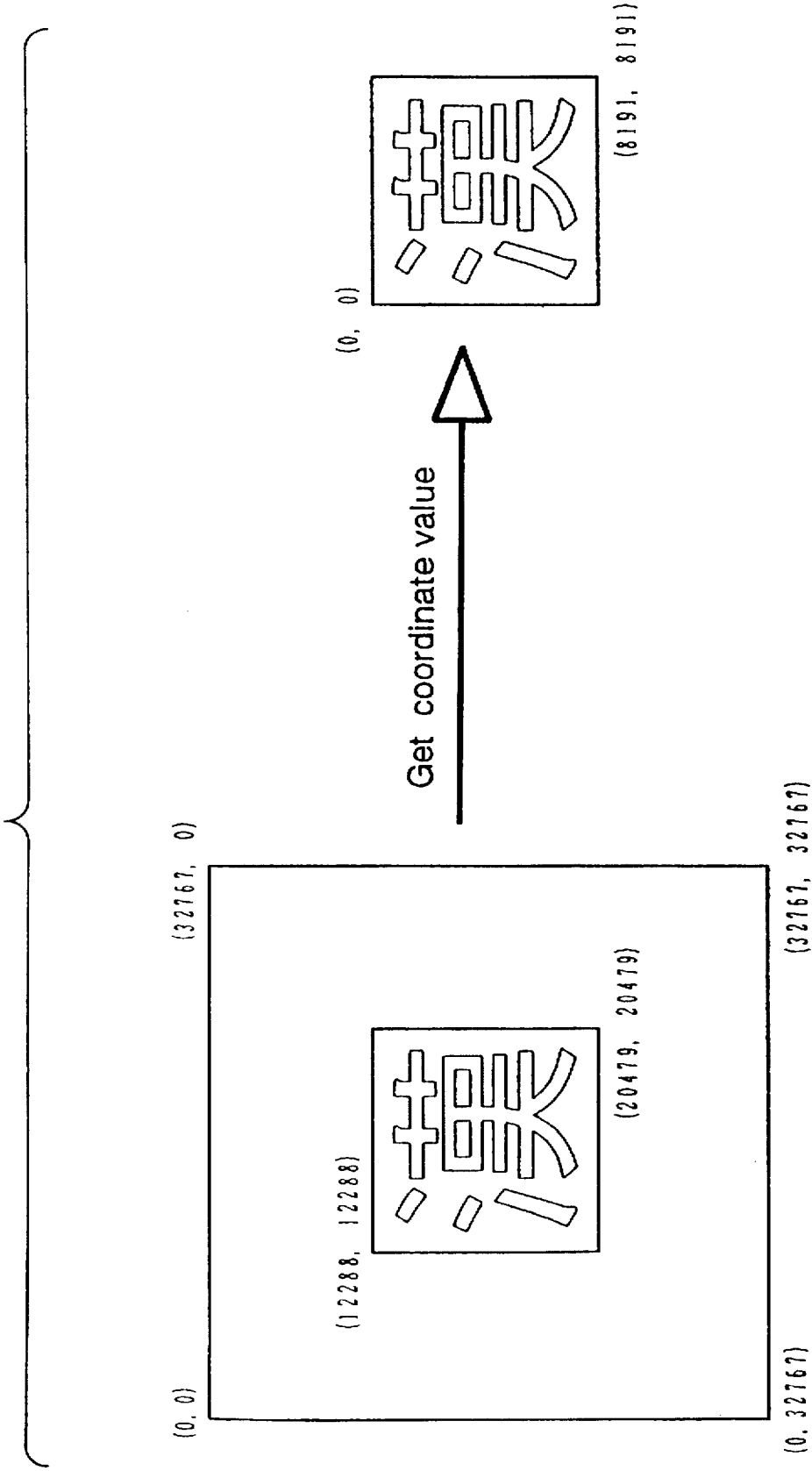
FIG. 43 explains rasterizing according to the related art.
Figure 44:
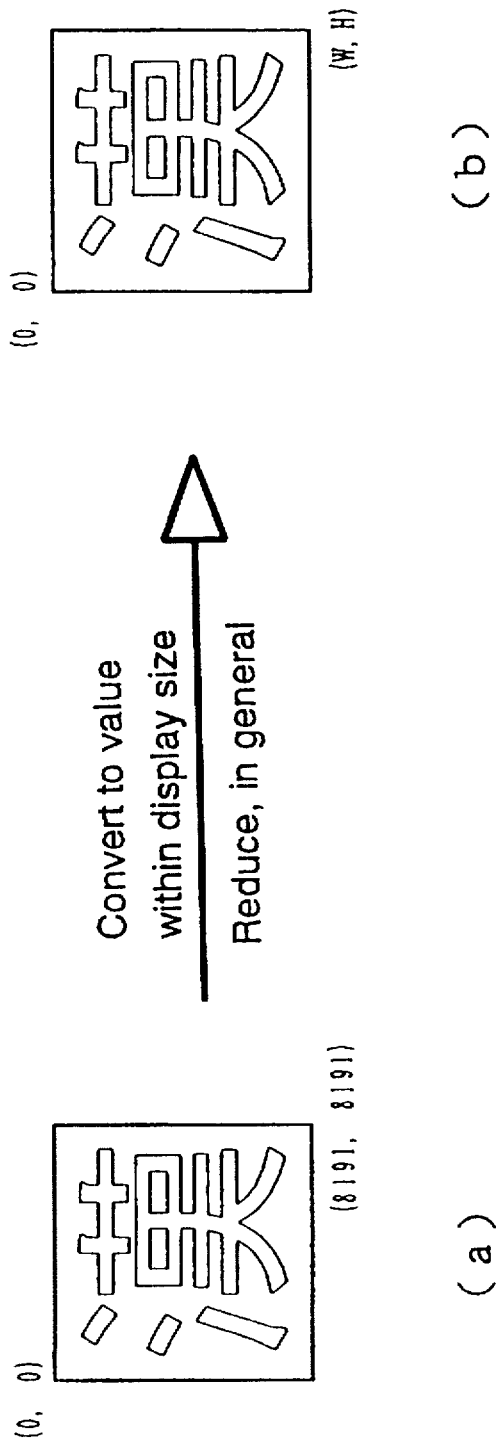
FIG. 44 explains rasterizing according to the related art.
Figure 45:
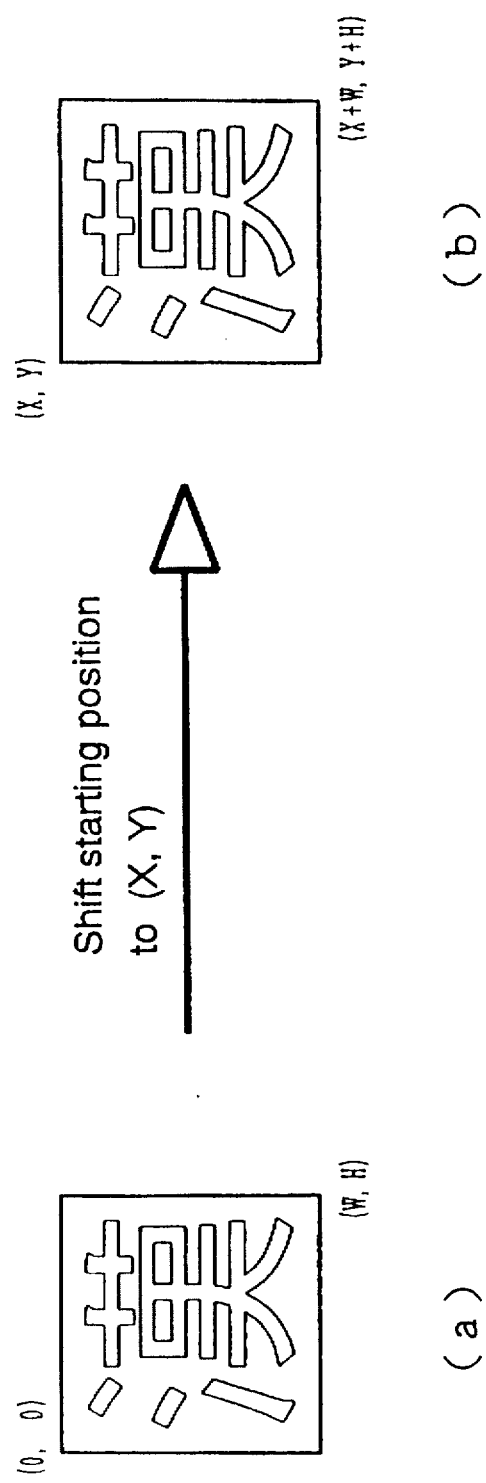
FIG. 45 explains rasterizing according to the related art.
Figure 48:
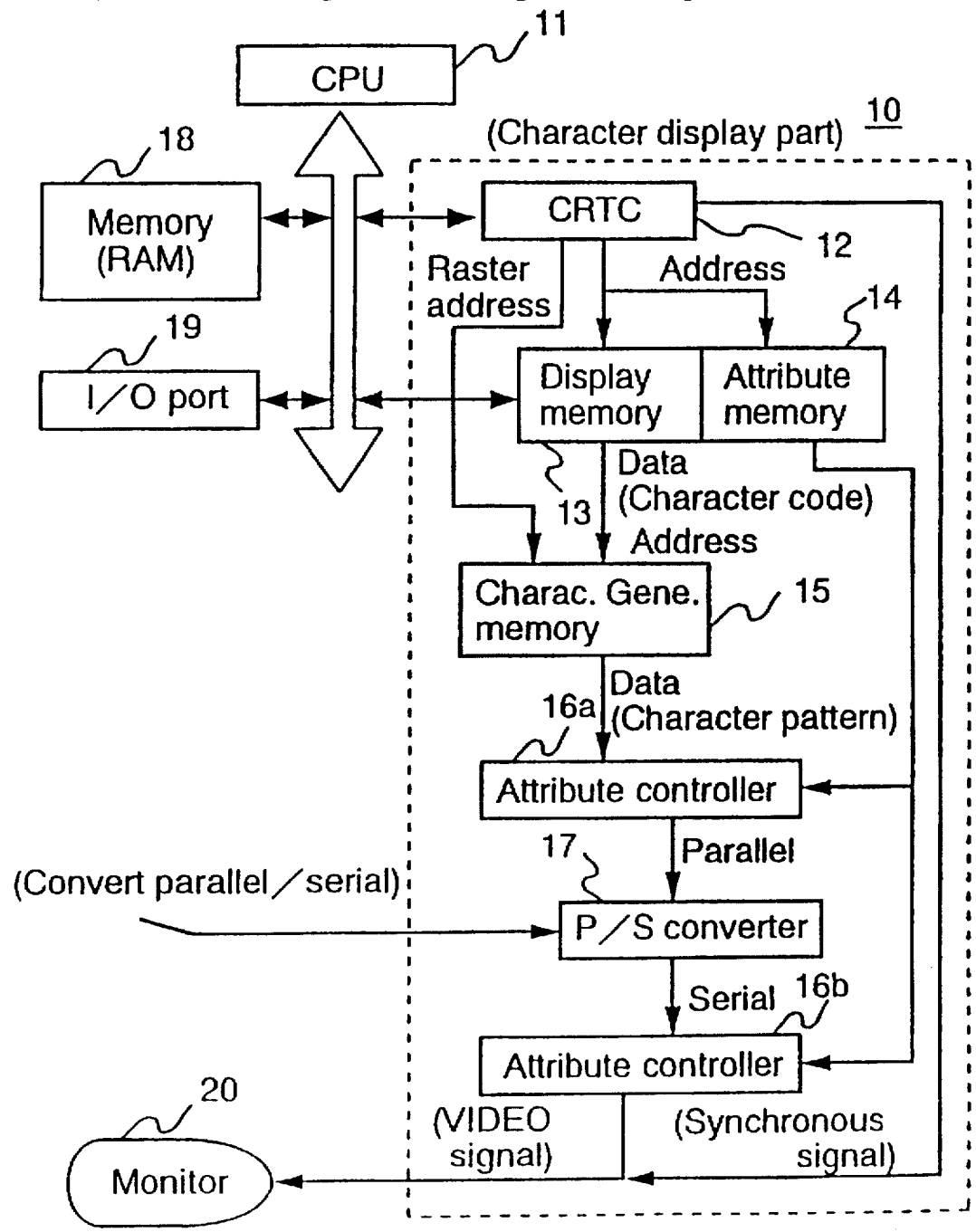
FIG. 48 shows thinning processing method according to the related art.

Steps S22–S25 are same with steps S11–S14 in FIG. 42, a flow chart of the rasterizing method according to the related art. In steps S22–S25, the rasterizer 22 converts the vector data of the outline font to an coordinate value to draw an outline of the character in the display size.

In step S26, the rasterizer 22 generates a raster image which includes the outline and the inside of the outline in the first area 27 of the work memory 26. As shown in (a) of FIG. 1, the rasterizer 22 generates the raster image by turning a memory element corresponding to a black part of the raster image to "ON", and a memory element corresponding to a white part of the raster image to "OFF." The rasterizer 22 may also generate a raster image in a different pattern such as a hatching, shade, etc., or in a different color such as gray, instead of making an outside of the outline white, and the outline and the inside of the outline black.

In step S27, the outline producer 24 produces an outline image in the second area 28 in the work memory 26. The outline producer 24 produces the outline image by turning a black part to "ON" and a white part to "OFF", as illustrated in (b) of FIG. 1.

In step S28, the operation unit 25 obtains a thinned raster image by making a logical operation of the raster image and the outline image. The operation unit 25 leaves a part which is "OFF" in the second area and "ON" in the first area in the first area. This logical operation is explained later.

In step S29, the output unit 29 converts the thinned raster image, which is obtained in step S28, to a position to start drawing according to the coordinate value. Then, drawing starts, and the process ends.

In steps S22–S26, a rasterizing process is performed. An outline producing process is performed in step S27, and an operation process is performed in step S28.

Each of steps in the flow chart of FIG. 5 is explained in more detail. A method of determining the outline width w by the outline width determiner in step S21 is explained.

The display condition, such as the display size, resolution level, typeface and character type is explained at first. The display size is a size to display (or print) a character. The size is 6 point, 8 point, 10 point . . . 29 point, 44 point, for example. A larger point means a larger character size.

When a display size of a character is smaller, lines which constitute the character becomes thinner. Therefore, it is better not to make the outline width w wider.

When a resolution level of a display unit is low, a line is displayed with less number of dots. Therefore, it is better not to make the line width w wider. As stated, the display size and the resolution level are essential elements to determine the outline width.

As for the typeface, there are Gothic, Ming-cho, bold types, etc. A new typeface may also created by a user.

As for the character type, there are English, number, Katakana, Hiragana, Kanji, symbol and figure. A character is converted to a character code, and the character code is used to recognize the character type. For example, character codes of 0–9 are recognized as numbers.

Figure 6:
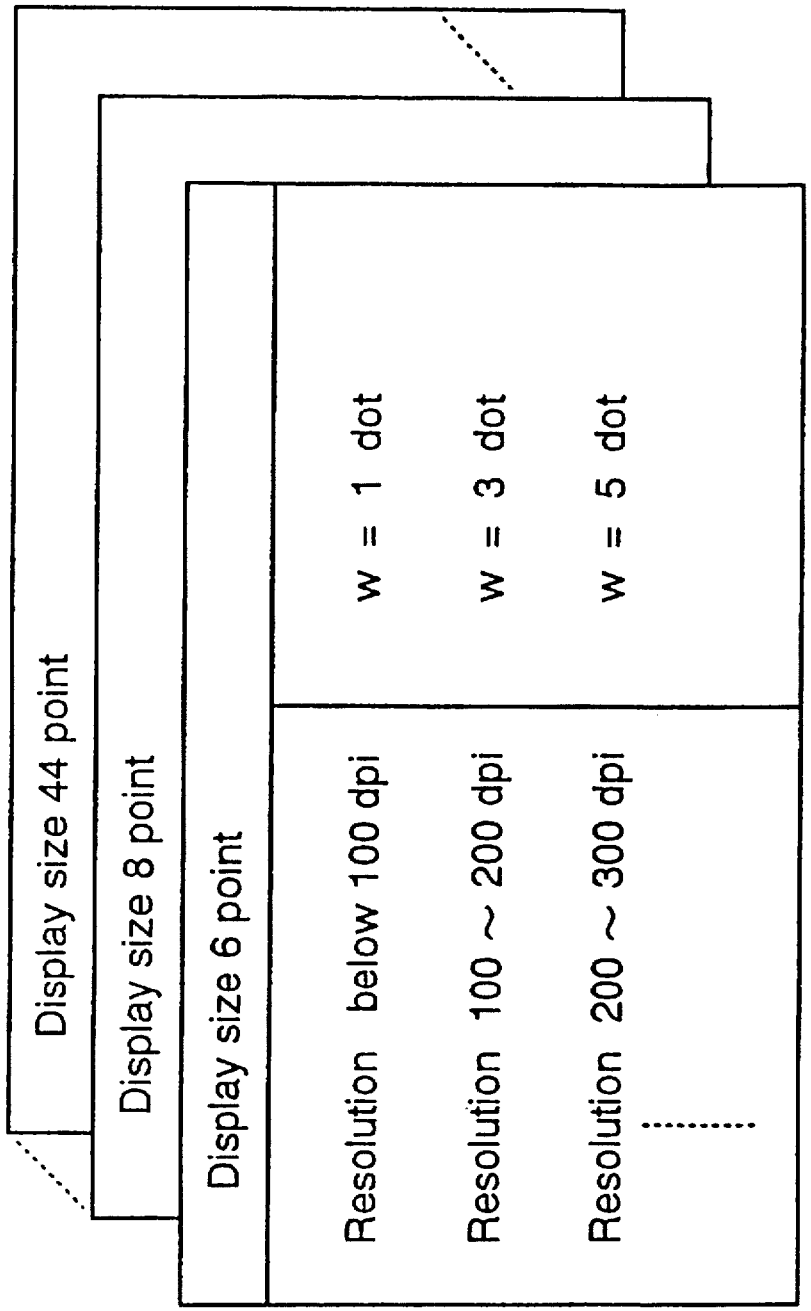
FIG. 6 shows the outline widths based on the display size and the resolution level in an embodiment of this invention.

In FIG. 6, the outline width for each of the resolution levels is shown for each of the display sizes. In FIG. 6, the outline width is determined based on the resolution level and the display size. For example, when a character with a display size of 6 point is outputted to an output apparatus with a resolution level below 100 dpi, the outline width w may be determined as 1 dot.

In FIG. 7, the outline width for each of the typefaces is shown for each of the display sizes. For example, an outline width of a Ming-cho character with a display size of 8 point may be determined as 1 dot.

Furthermore, an additional step may be placed between step S21 and S22. This additional step decides whether thinning processing is performed or not. For example, when the display size is 6 point, w=0, and if w=0, thinning processing is not performed.

For the character type, a similar table shown in FIGS. 6 and 7 may be used to determined the outline width.

Thinning processing is performed to solve obscurity problem due to the resolution levels. Therefore, it is advantageous for the outline width to be mainly determined based on the resolution levels. Occasionally, the typeface and the character type may be used to determine the outline width.

The outline width w may also be determined as follows. The outline width w is determined based on the display size and the resolution level in FIG. 6. Then, a modifying value of the outline width m which is shown in FIG. 8 is referred to, and the outline width is determined as w+m. The modifying value of the outline width is preferred to be an even number in order to leave a final outline width w+m as an odd number.

For example, when the display size is 6 point and the resolution level is 100–200 dpi in FIG. 6, w=3 is obtained. Then, when the character type is a number, m=+2 dots is obtained from FIG. 8. As a result, the final outline width is obtained as w+m=3+2=5 dots.

A similar table shown in FIG. 8 is created also for the typeface to determine the modifying value of the outline width w. FIGS. 6–8 are created for full stroke characters. For half stroke characters, similar figures are also created.

The modifying value is preferably within a range of numbers which will not produce a final outline width of 0 or less than 0. Or, if the final outline width becomes either 0 or less than 0, it is also possible that thinning processing is not performed, and steps S27 and S28 are omitted. After step S26 in such an instance, the process goes to step S29 as in the rasterizing process according to the related art.

It is also possible that the outline width is determined by a user. The outline width may be assigned in dot directly by the user. Or, the outline width may be selected and assigned by the user from levels of thinness, such as level 1, level 2, level 3, for example. When the user assigns the outline width, the user may check if the assigned outline width is applicable to the process in reference with the display size and resolution level.

In step S27, the outline producer 24 works as follows.

Figure 9:
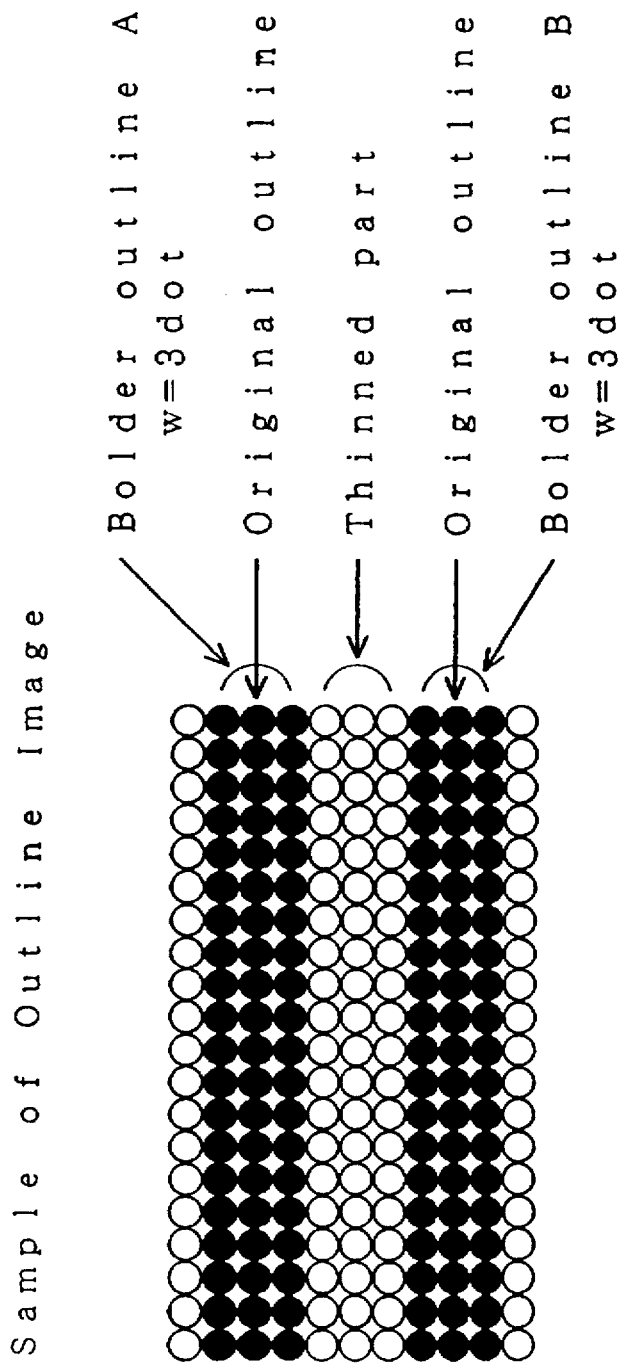
FIG. 9 illustrates a magnified outline image in dot patterns in an embodiment of this invention.

A first example of an outline image which is produced by the outline producer 24 is illustrated in FIG. 9. The outline producer 24 produces the outline image in the second area 28 in the work memory 26. The outline producer 24 turns memory elements in black dots to "ON", and memory elements in white dots to "OFF." In the example shown in FIG. 9, an original outline width is 1 dot, a space between the original outlines (a width of a raster image) is 7 dots, and an outline width w is 3 dots.

Among the bolder outlines A and B (black dots in FIG. 9) which are in width of 3 dots, 2 dots each from up and down, 4 dots in total is on or inside of the original outlines. In step S28, the operation unit 25 excludes these 4 dots from the original raster image which is generated by the rasterizer 22.

White dots between the bolder outlines show a thinned line which should remain in the raster image. The width of the thinned line is 7 dots−4 dots=3 dots. The width of the thinned line is as follows:

Width of thinned line=Space between original outlines−2(1+(w1)/2)

Figure 10:
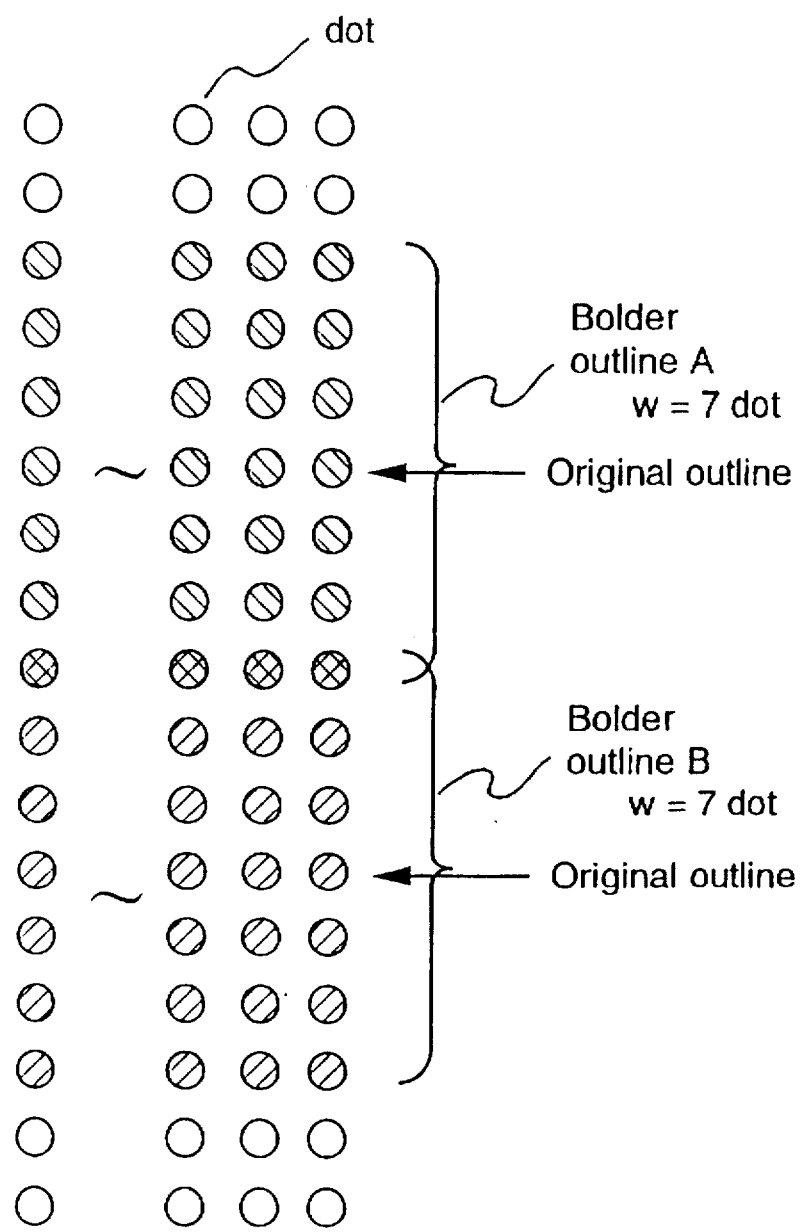
FIG. 10 illustrates magnified dot patterns of the outline image in an embodiment of this invention.

FIG. 10 illustrates a case in which the space between the original outlines is 7 dots and the outline width w is 7 (dots).

In this example, a bolder outline A and a bolder outline B overlap each other in 1 dot. Therefore, a part for a thinned line does not exist. In order to solve this problem, the outline width w may be determined to leave a thinned line, as follows.

The outline producer 24 makes an exclusive disjunction (EXOR) operation with the upper bolder outline and the lower bolder outline.

Figure 11:
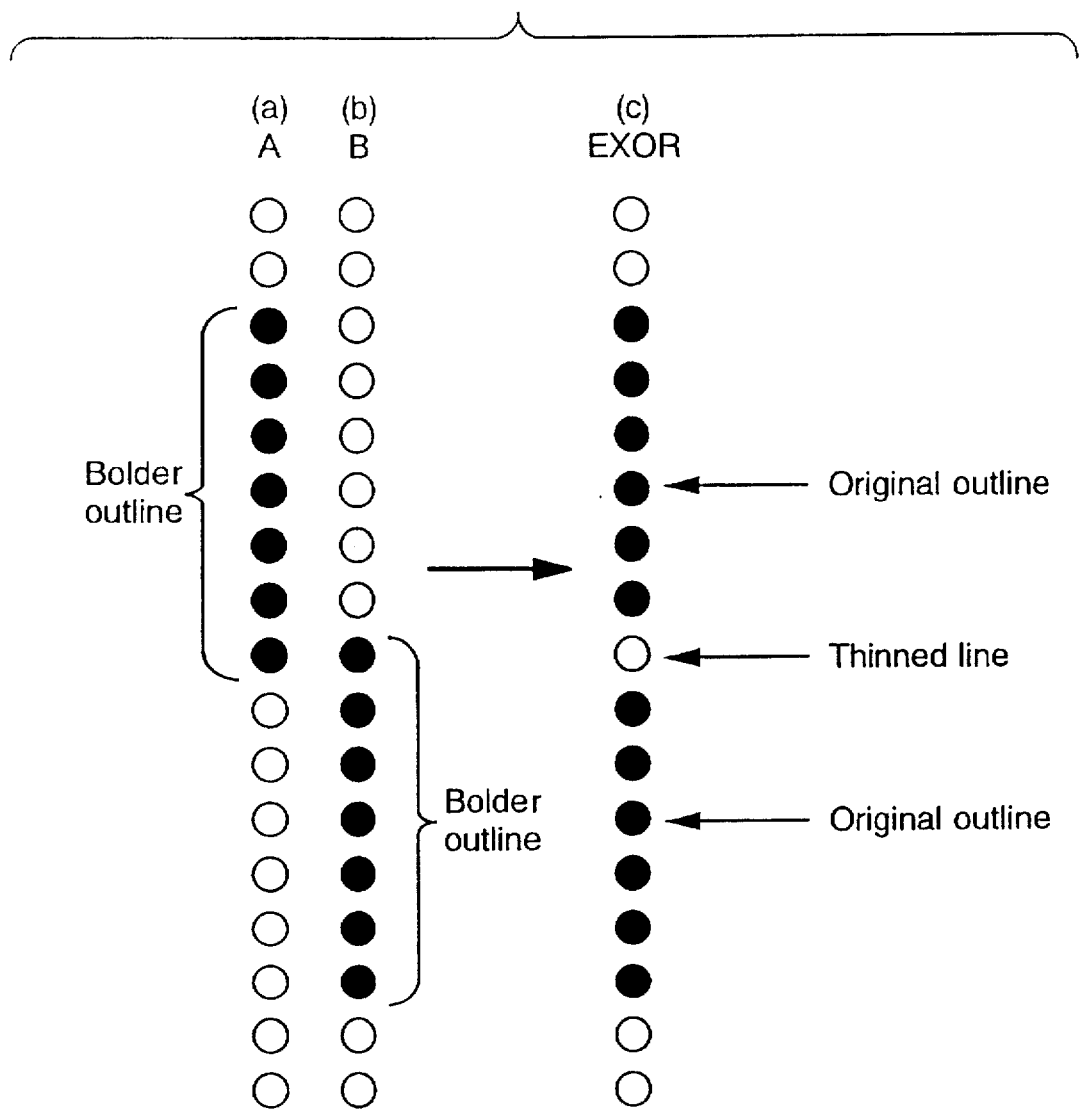
FIG. 11 illustrates dot patterns of the outline image (EXOR) in an embodiment of this invention.

In (a) of FIG. 11, the bolder outline A in FIG. 10 is shown in black dots. In (b) of FIG. 11, the bolder outline B in FIG. 10 is shown in black dots. In (c) of FIG. 11, a dot pattern which is obtained by the EXOR operation of (a) and (b) is shown.

In FIG. 11, one dot column is illustrated for each of (a), (b) and (c) for a convenience.

In (c) of FIG. 11, an overlapped part of the black dots of (a) and (b) is a white dot of 1 dot. Therefore, the line of 1 dot in width between the original outlines remains as a thinned line.

As stated, when the outline image is produced, 1 dot is able to remain even after thinning processing owing to the EXOR operation. Therefore, a line which constitutes the character does not disappear. Besides the EXOR operation, a processing method to turn an area where either A or B is "ON" to "ON" is also able to be used.

In step S28, the operation unit works as follows.

The raster image in (a) of FIG. 1 is generated in the first area 27 in the work memory 26 by the rasterizer 22. The outline image in (b) of FIG. 1 is produced in the second area 28 in the work memory 26.

Each of the images is produced as a bit map image in each area of the work memory. Each of memory elements corresponding to each of dots in the bit map is turned to either "OFF" (a white part) or "ON" (a black part), and each of images is produced.

Then, the operation unit 25 leaves dots in the first area 27 where the first area 27 is "ON" (black in FIG. 1) and the second area 28 is "OFF" (white in FIG. 1). In this way, the thinned raster image is generated in the first area 27 as illustrated in (c) of FIG. 1.

Figure 12:
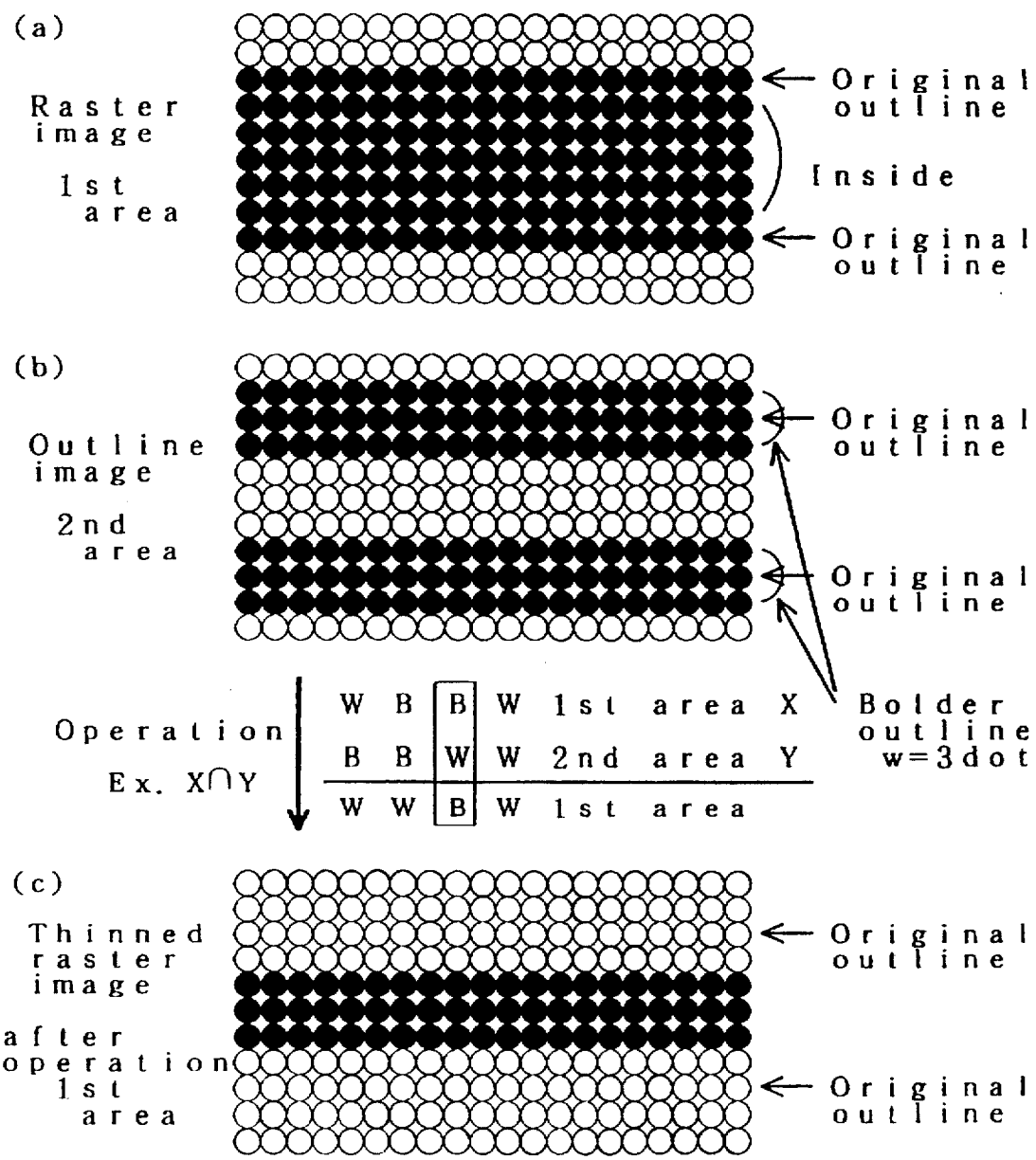
FIG. 12 illustrates a details of thinning processing in an embodiment of this invention.

In (a) of FIG. 12, a part of the raster image is magnified as dot patterns. In (b) of FIG. 12, a part of the outline image is magnified and shown in dot patterns. In (c) of FIG. 12, a part of the thinned raster image is magnified and shown in dot patterns. In FIG. 12, data in the first area, which is "ON" (black) or "OFF" (white), is X. Data in the second area, which is "ON" (black) or "OFF" (white), is Y.

In (c) of FIG. 12, the thinned raster image is generated by leaving a part of the first area 27 where the second area 28 is "OFF" and the first area 27 is "ON." This process is equal to an operation of conjunction of X and a reversed value of Y. This operation may be substituted with another operation. As a result of the operation, a raster image which is thinner by 2 dots in both upper and lower from the original outlines is generated.

In embodiment 1, the font processor according to the thinning method is explained. The font processor generates a raster image (value written in two values of "ON" and "OFF" is X) from the outline font. The raster image is same with the raster image which is generated according to the related art.

Then, the outline width is determined based on the resolution level, display size, character type, etc. The outline for the raster image is made bolder to produce the outline image (value written in two values of "ON" and "OFF" is Y).

Finally, an operation of a conjunction of X and a reversed value of Y is made to generate the thinned raster image.

Embodiment 2.

In embodiment 2, a font processor which is able to perform both thinning processing and bolding processing is explained. Since thinning processing is performed in the same way as in embodiment 1, the explanation on thinning is omitted in embodiment 2.

Figure 13:
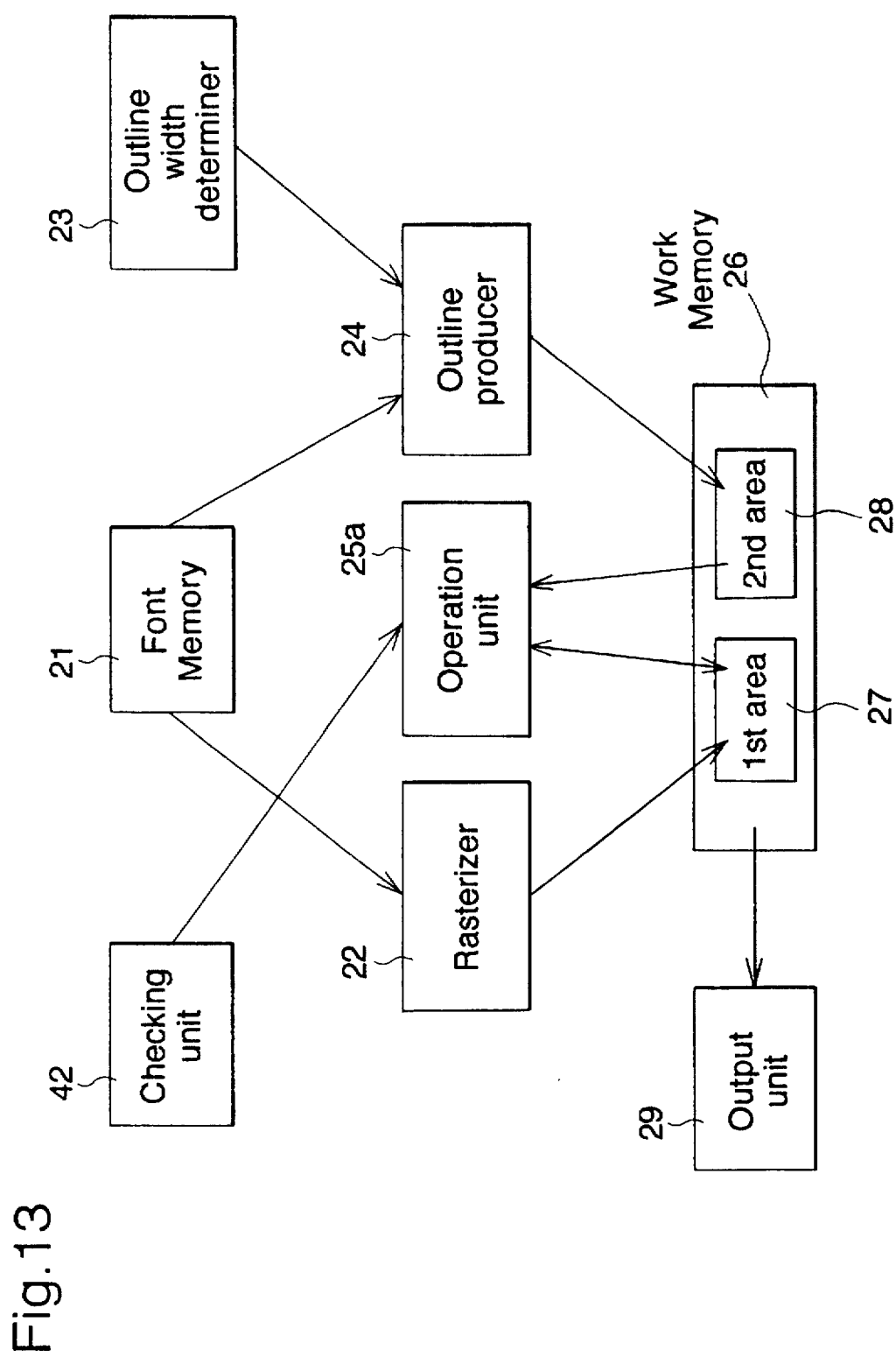
FIG. 13 is a block chart in an embodiment of this invention.

FIG. 13 is a block chart of the font processor of embodiment 2. An operation unit 25a performs both thinning processing and bolding processing. A judging unit 42 judges either thinning processing or bolding processing is performed. The judgement on either thinning processing or bolding processing is performed is made based on the resolution level or some other factor which is defined by a user.

Figure 14:
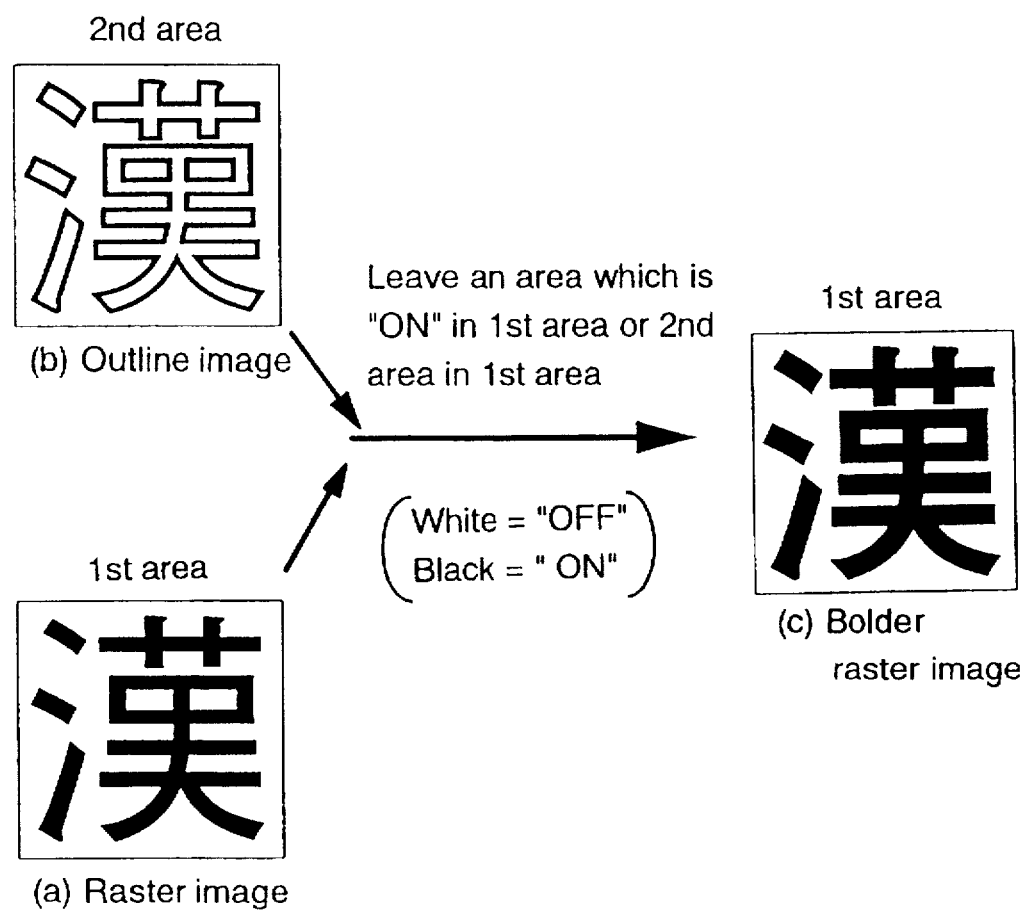
FIG. 14 illustrates a concept of bolding processing in an embodiment of this invention.

A concept of bolding processing is shown in FIG. 14. The rasterizer 22 generates a raster image in the first area as illustrated in (a) of FIG. 14. The outline producer 24 produces an outline image in the second area as illustrated in (b) of FIG. 14. The outline width of the outline image was determined by the outline width determiner 23. Until here, the process is same with the process of thinning processing, which is already explained in embodiment 1.

After this, the operation unit 25a turns dots in the first area, which are black in the second area and white in the first area, to black. The dots which are already black in the first area are left as black dots. As a result, a bolder raster image is generated as illustrated in (c) of FIG. 14.

Figure 15:
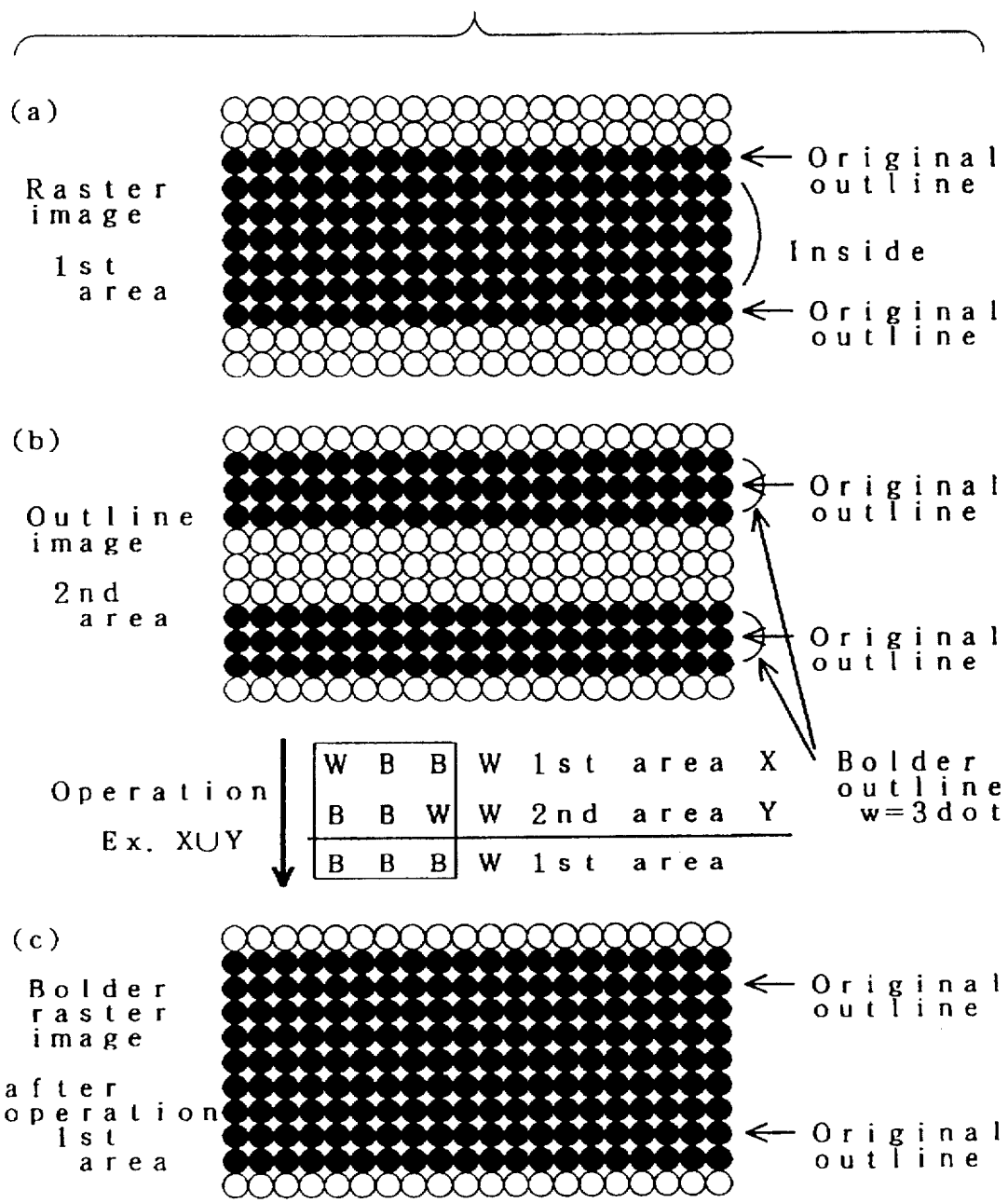
FIG. 15 illustrates a detailed explanatory figure on bolding processing in an embodiment of this invention.

A part of each of the raster image, outline image and bolder raster image is magnified and shown in dot patterns in FIG. 15. In FIG. 15, data which is written with "ON" (black) or "OFF" (white) in the first area is X. Data which is written with "ON" (black) or "OFF" (white) in the second area is Y. In (c) of FIG. 15, the bolder raster image is generated by turning the dots in the first area, which are "ON" in either the first area or the second area, to "ON.". Furthermore, a logical operation of disjunction of X and Y may be made, for example to generate the bolder raster image.

When the outline width w=3, the bolder raster image is bolder than the original raster image by 1 dot in upper and lower and in left and right. Therefore, it is bolder by 1 dot×2=2 dots in total.

Figure 16:
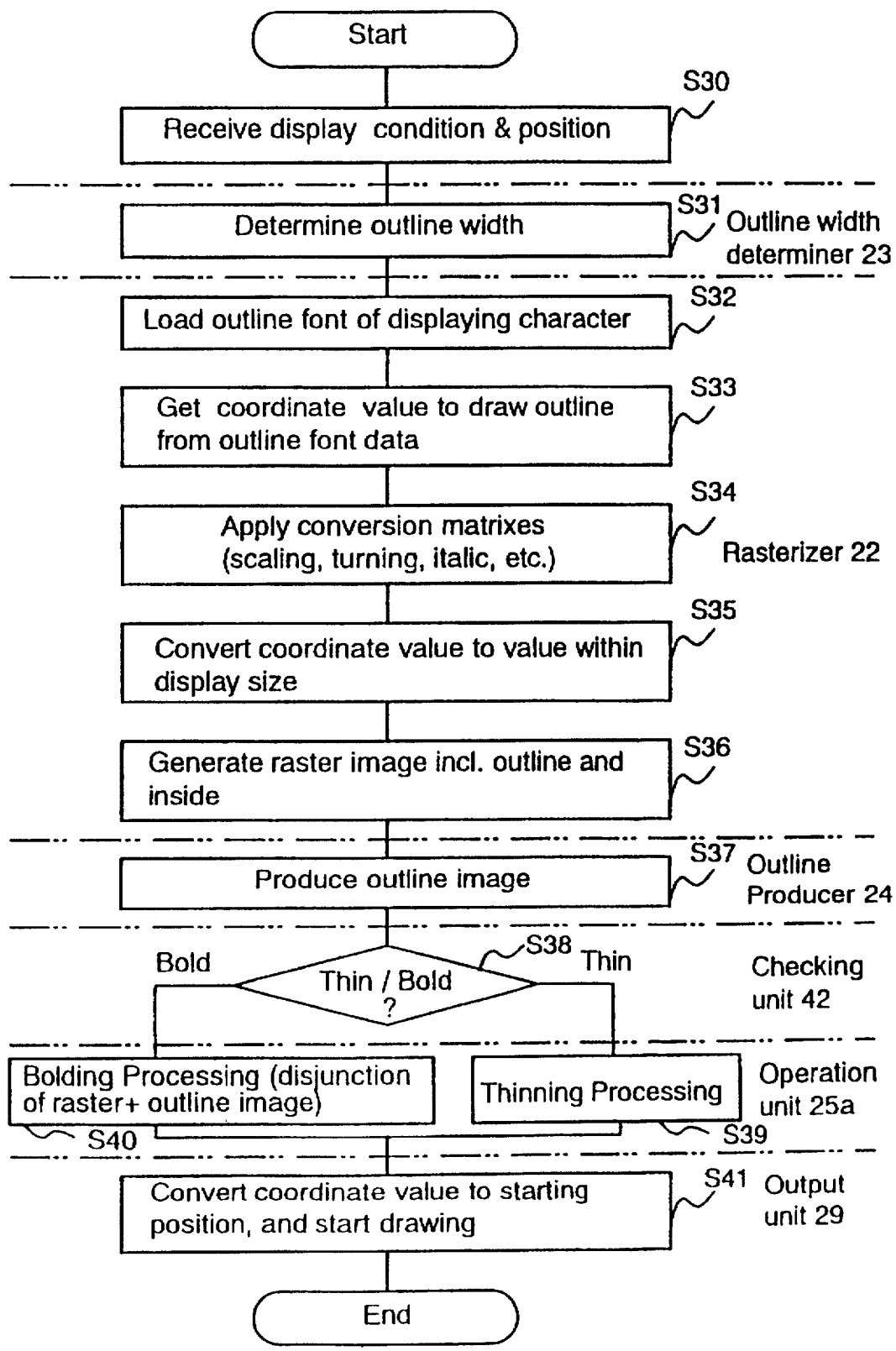
FIG. 16 shows a flow of thinning or bolding processing in an embodiment of this invention.

FIG. 16 is a flow chart of thinning and bolding processing in embodiment 2. In step S30, a display condition and a display position are obtained. The display condition is the display size, typeface, character type, resolution level, etc. as in embodiment 1. At the same time, either thinning processing or bolding processing is assigned.

In steps S30–S37, the outline width is determined based on the obtained condition, and the raster image, and then the outline image are produced. These steps are same with steps S20–S27 of FIG. 5 in embodiment 1. Therefore, an explanation is omitted in embodiment 2.

In step S38, the judging unit 42 judges either thinning processing or bolding processing is performed according to a request by the user. In step S38, the judgement may be made based on the resolution level. In case of thinning, thinning processing is performed by the operation unit 25a according to an operation which is same with the operation in step S28 in FIG. 5. Data written in two values of "ON" and "OFF" of the raster image is X. Data written in two values of "ON" an "OFF" of the outline image is Y. The logical operation for thinning is a conjunction of X and a reversed Y, for example.

In step S38, if it is judged that bolding processing should be performed, bolding processing is performed in step S40. In step S40, an operation of disjunction of the raster image X and the outline image Y is made for bolding processing.

In step S41, the output unit 29 converts a coordinate value of the generated raster image to the position to start drawing, and starts drawing.

This is the flow of processing by the font processor which is able to perform both thinning processing and bolding processing.

In embodiment 2, the font processor which is able to perform both thinning processing and bolding processing is explained. The process of thinning processing is same with the process in embodiment 1. A characteristic of bolding processing in embodiment 2 is that bolding processing is performed by making an logical operation of disjunction of the raster image and the outline image.

Embodiment 3.

In embodiment 3, a font processor which is able to perform both thinning processing and bolding processing is explained. The process of bolding processing in embodiment 3 differs from the process in embodiment 2.

Figure 17:
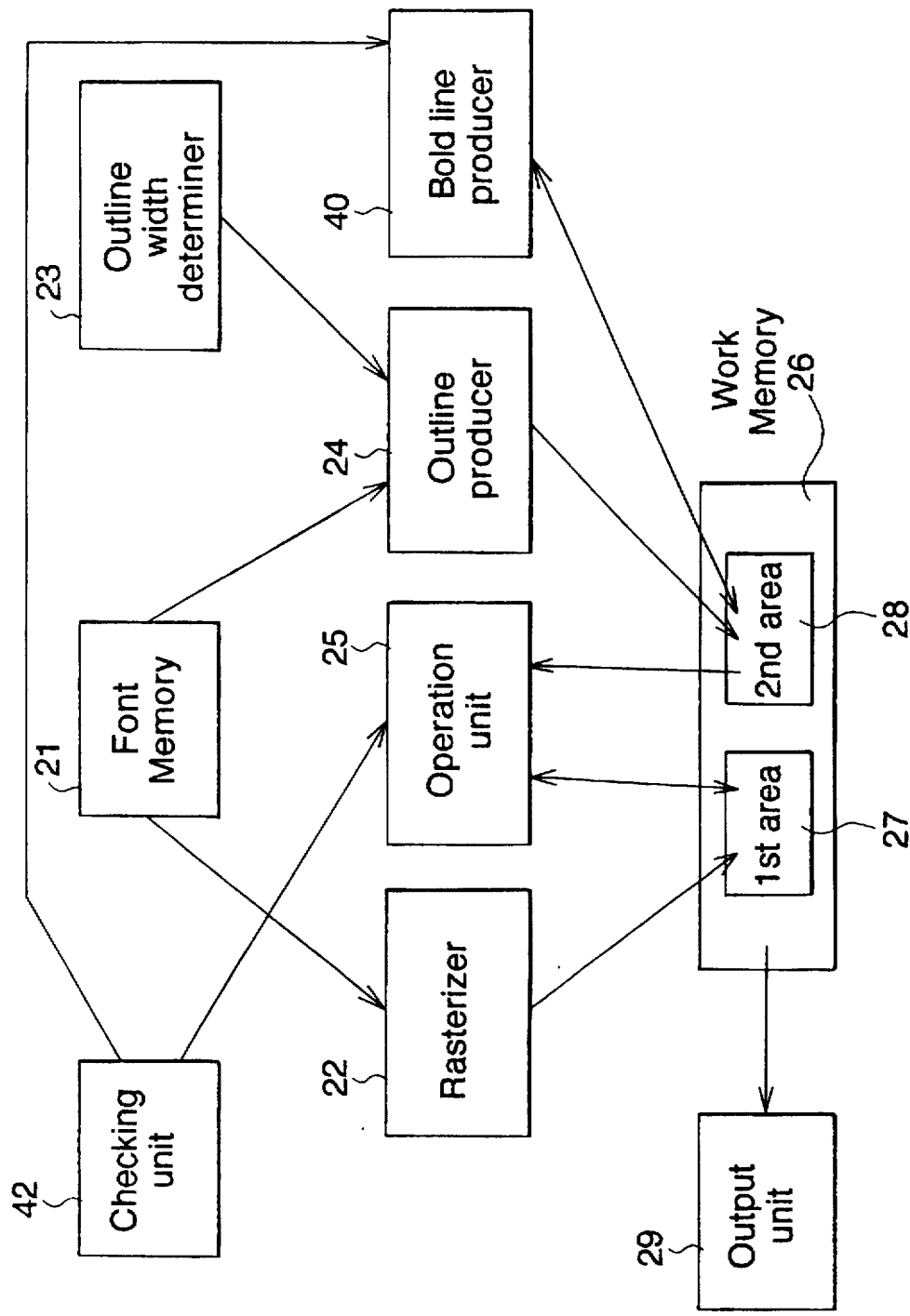
FIG. 17 is a block chart in an embodiment of this invention.

FIG. 17 is a block chart of the font processor of embodiment 3. For FIG. 17, the judging unit 42 and a bold line producer 40 are added to the block chart of FIG. 4 in embodiment 1. The bold line producer 40 rasterizes an inside of an outline image which is produced by the outline producer 24, and generates a bolder raster image.

The process of thinning processing is same with the process in embodiment 2. Therefore, an explanation on the process of thinning processing is omitted.

Figure 18:
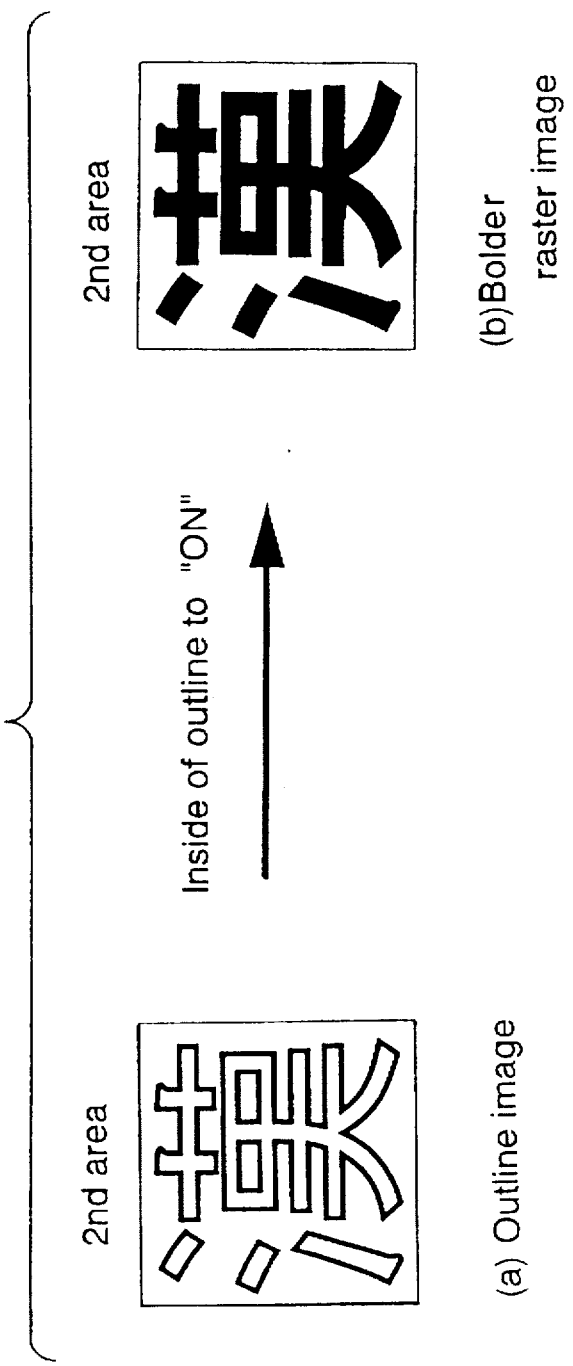
FIG. 18 illustrates a concept of bolding processing in an embodiment of this invention.

A concept of bolding is explained in FIG. 18. The outline producer 24 produces the outline image in the second area 28, as illustrated in (a) of FIG. 18. The outline width of the outline image is a value which is determined by the outline width determiner 23. The outline producer 24 turns memory elements corresponding to the black part to "ON" and the white part to "OFF" to produce the outline image. The function of the outline producer 24 is same as in embodiment 2.

The bold line producer 40 generates the bolder raster image as illustrated in (b) of FIG. 18 by turning an inside of the bolder outlines of the outline image to "ON".

Figure 19:
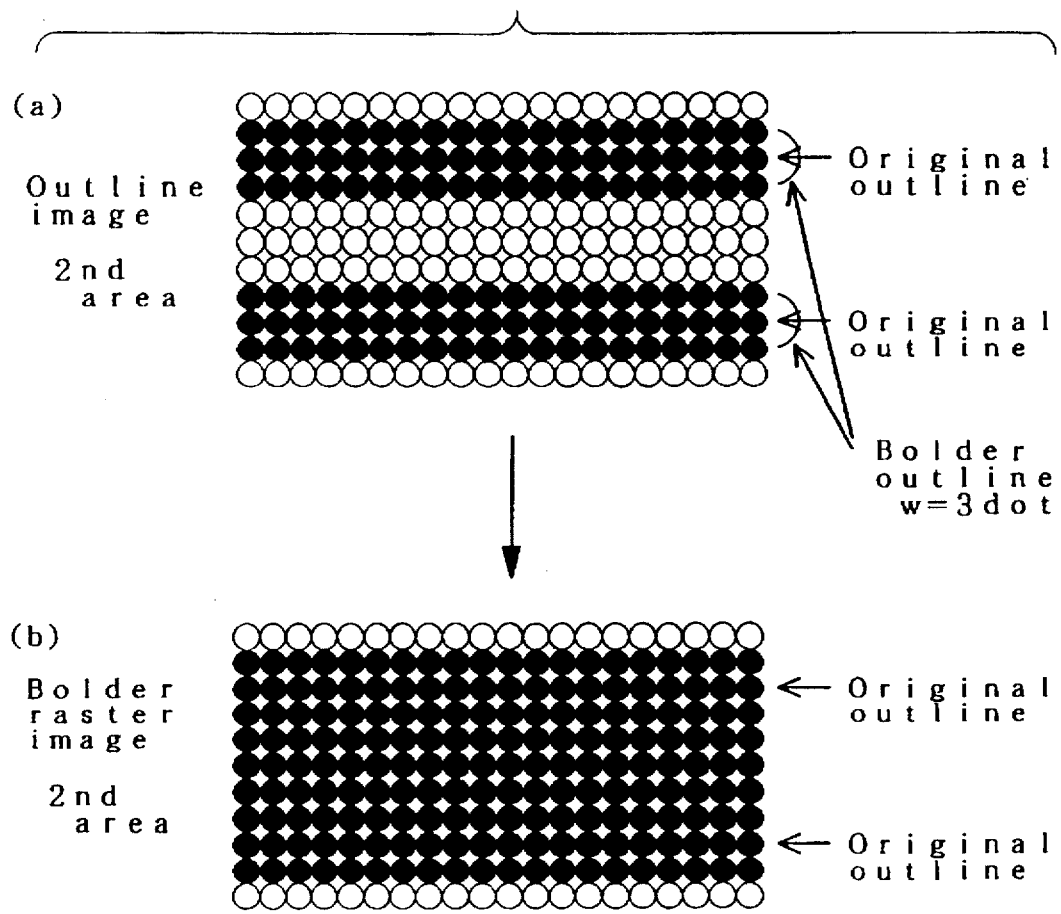
FIG. 19 illustrates a detailed explanatory figure on bolding processing in an embodiment of this invention.

In FIG. 19, the outline image and the bolder raster image are magnified and shown in dot patterns. The outline image which is illustrated in (a) of FIG. 19 is same with the outline image in embodiment 2. The bold line producer 40 turns memory elements which correspond to the dots between the bolder outlines to "ON", and the bolder raster image which is illustrated in (b) of FIG. 19 is generated.

Figure 20:
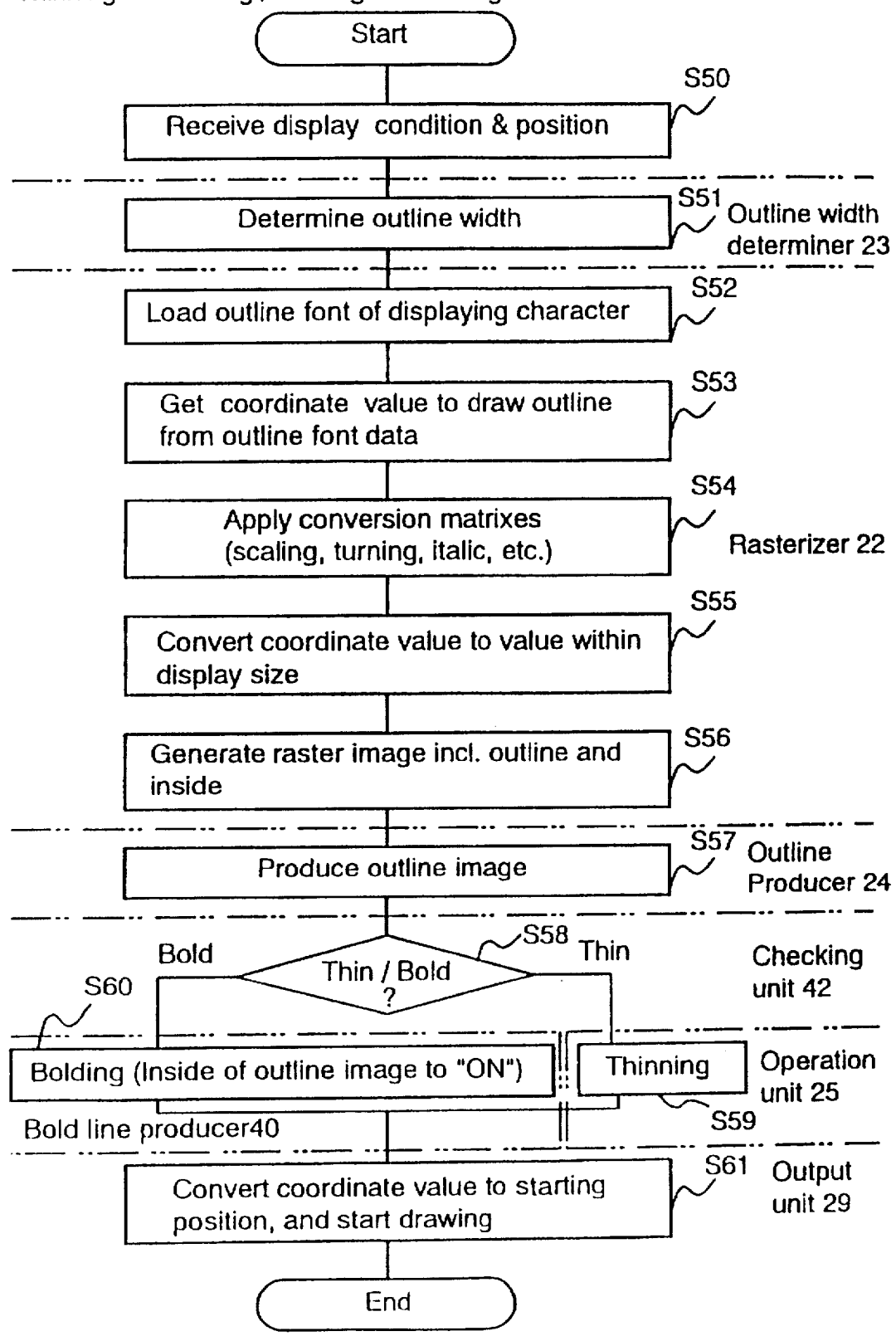
FIG. 20 shows a flow of thinning processing or bolding processing in an embodiment of this invention.

FIG. 20 is a flow chart of embodiment 3. FIG. 20 differs from FIG. 16 in step S60 of FIG. 20 and step S40 of FIG. 16. In step S60 of FIG. 20, the bold line producer 40 generates the bolder raster image by turning the inside of the outline image to "ON". Besides this, other steps are same. Therefore, explanation is omitted.

As stated, embodiment 3 relates to the font processor which is able to perform both thinning processing and bolding processing. The process of thinning processing is same with the process in embodiment 1. A characteristic of this bolding processing is to turn the inside of the outline image to "ON" by the bold line producer 40.

Embodiment 4.

In embodiment 4, a process of storing a thinner or bolder raster image in a cache memory in order to speed up a font display processing time is explained.

Figure 21:
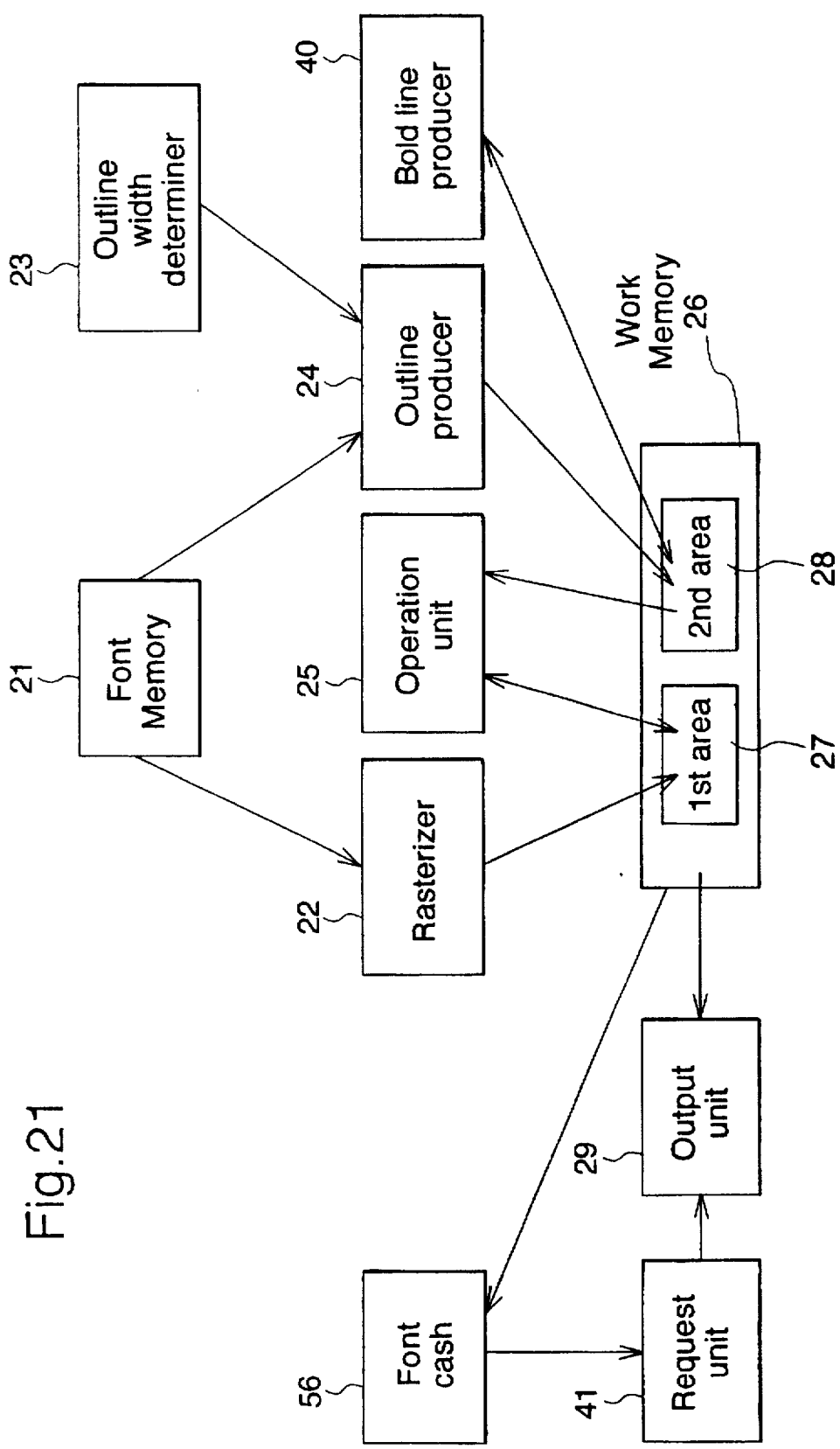
FIG. 21 is a block chart in an embodiment of this invention.

FIG. 21 is a block chart of a font processor of embodiment 4. In FIG. 21, a font cache 56, a request unit 41 and the bold line producer 40 are added to FIG. 4 of embodiment 1. The font cache 56 is a cache memory which stores a rasterized raster image. The request unit 41 stores the raster image in the font cache 56, and judges if a displaying character is stored in the font cache. If the character is stored in the font cache 56, the request unit reads the raster image from the font cache 56, and displays the raster image.

Figure 22:
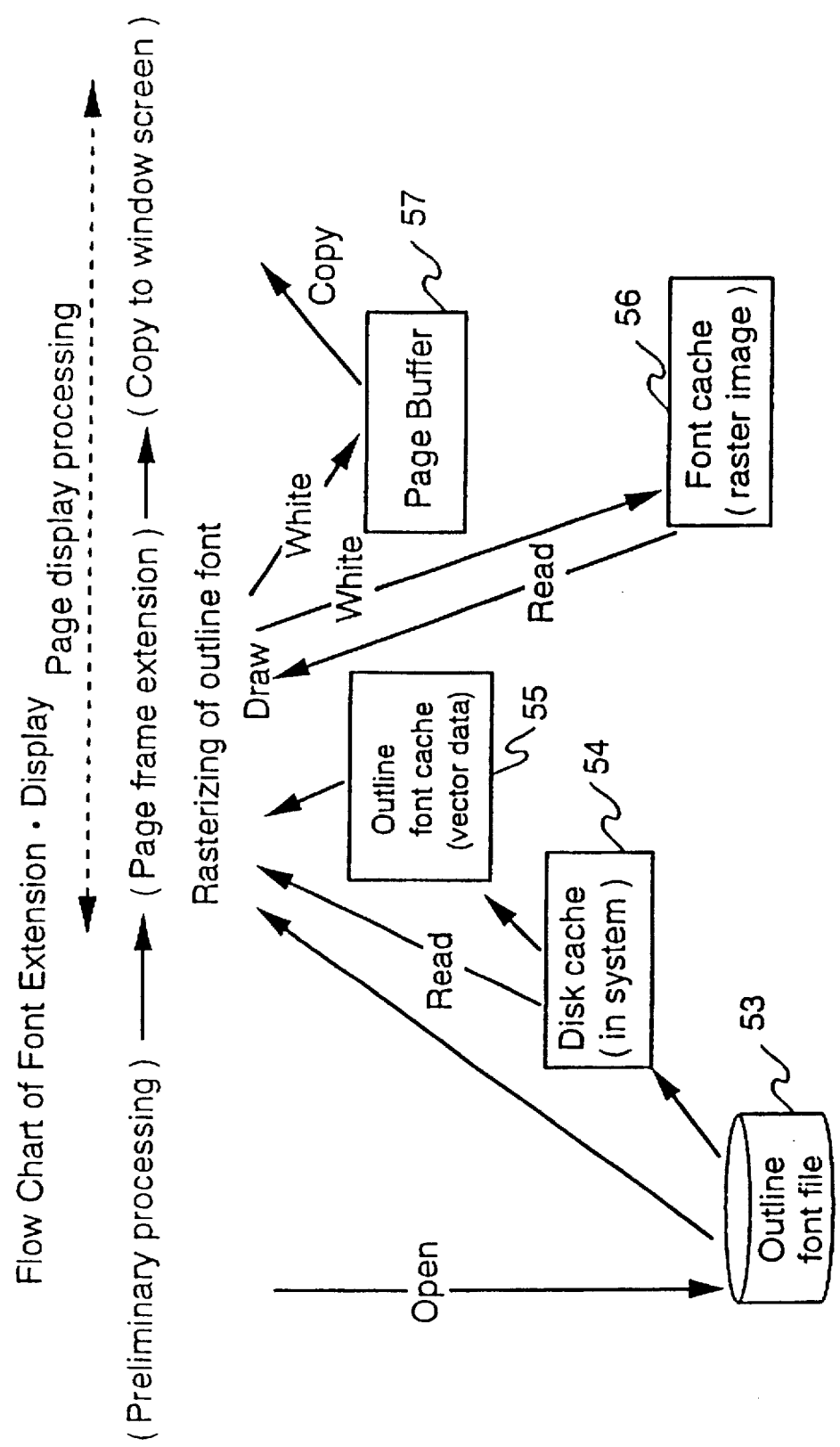
FIG. 22 shows a sample of a flow of font display in an embodiment of this invention.

FIG. 22 is a flow chart of font display. In FIG. 22, a display unit according to a window system is used. In FIG. 22, an outline font file 53, a disk cache (in the system) 54, and an outline font cache 55 which stores vector data are shown. The outline font cache 55 is an exclusive cache memory to store the vector data of the outline font. The font cache 56 stores the raster image. The font cache 56 is a cache memory to store the rasterized raster image which is generated from the outline font. The raster image can be either a thinned raster image or a bolded raster image. The raster image can also be a raster image which is generated according to the related art. In FIG. 22, a page buffer 57 is also shown. The page buffer 57 is a memory which stores a data in a displayed screen of the window.

A page display process is as follows.

A preliminary process to open the outline font file 53 is performed. Then, a page frame extension is made. The page frame extension is a process of generating information, which is outputted, in the page buffer. For example, when an outline font of a character, which should be displayed in the window screen, is rasterized, the rasterized information is stored in the page buffer. If a vector data of the outline font is in the outline font cache 55, it is read from the outline font cache 55. If the vector data of the outline font is not stored in the outline font cache 55, the data is searched for in the disk cache 54. If the data is in the disk cache 54, the data is read from the disk cache. If the data is still not in the disk cache 54, the data is read from the outline font file 53. After the data is read, a rasterizing process of the outline font is performed. The rasterizing process can be one of thinning processing, bolding processing and processing which is stated in the related art. The rasterized raster image is stored in the page buffer 57. When the page frame extension of a window screen ends, if necessary, the page buffer 57 is copied to the window screen, and the process ends.

So far, the process in case that the font cache 56 is not in the system is explained. If the font cache 56 is in the system, the request unit 41 checks if a raster image of a rasterizing character is in the font cache 56, at first. If the raster image is found in the font cache 56, the image is read from the font cache 56, and stored in the page buffer 57. If the raster image is not stored in the font cache 56, the request unit 41 rasterizes the outline font, and generates the raster image of the outline font in the font cache 56.

Figure 23:
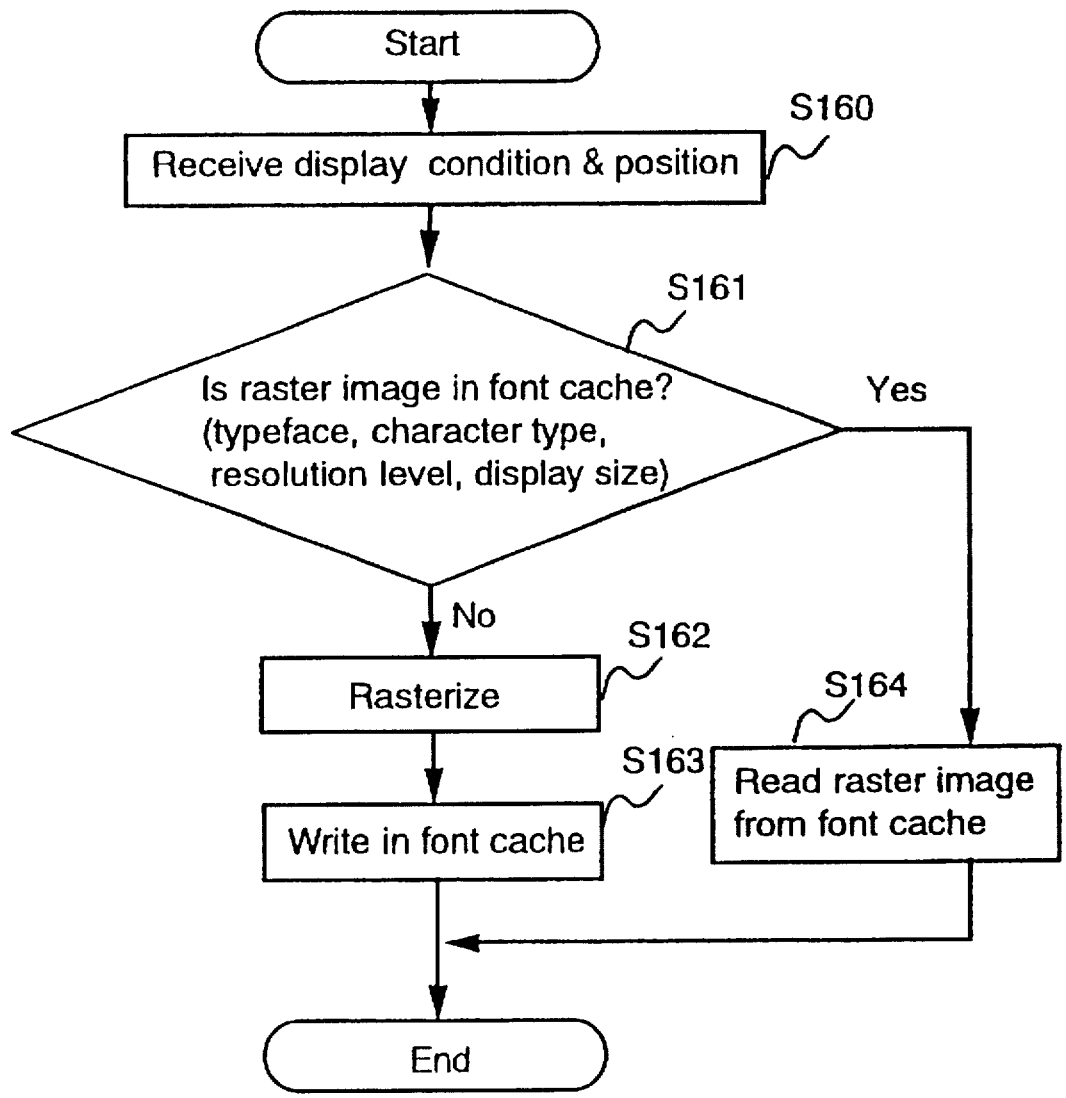
FIG. 23 shows a flow of processing in case that a cache memory is used in an embodiment of this invention.

FIG. 23 is a flow chart of using the cache memory. In step S160, a display condition and a display position are obtained. Step S160 is same with step S20 of FIG. 5 in embodiment 1. In step S161, it is judged if the raster image is in the font cache 56 according to the display condition such as a typeface, character type, resolution level, display size, etc. If the raster image is in the font cache 56, the raster image is read in step S164, and the process ends. In step S161, it is judged if the rasterized image is in the font cache 56. If it is not in the font cache 56, rasterizing processing is performed in step S162. Rasterizing processing is one of thinning processing, bolding processing, or processing which is stated in the related art. In step S163, the raster image which is rasterized in step S162 is written in the font cache 56, and the process ends.

In embodiment 4, the font processor which has the request unit to use the cache memory is explained. The font processing is able be performed in a high speed owing to the usage of the cache memory.

Embodiment 5.

Figure 24:
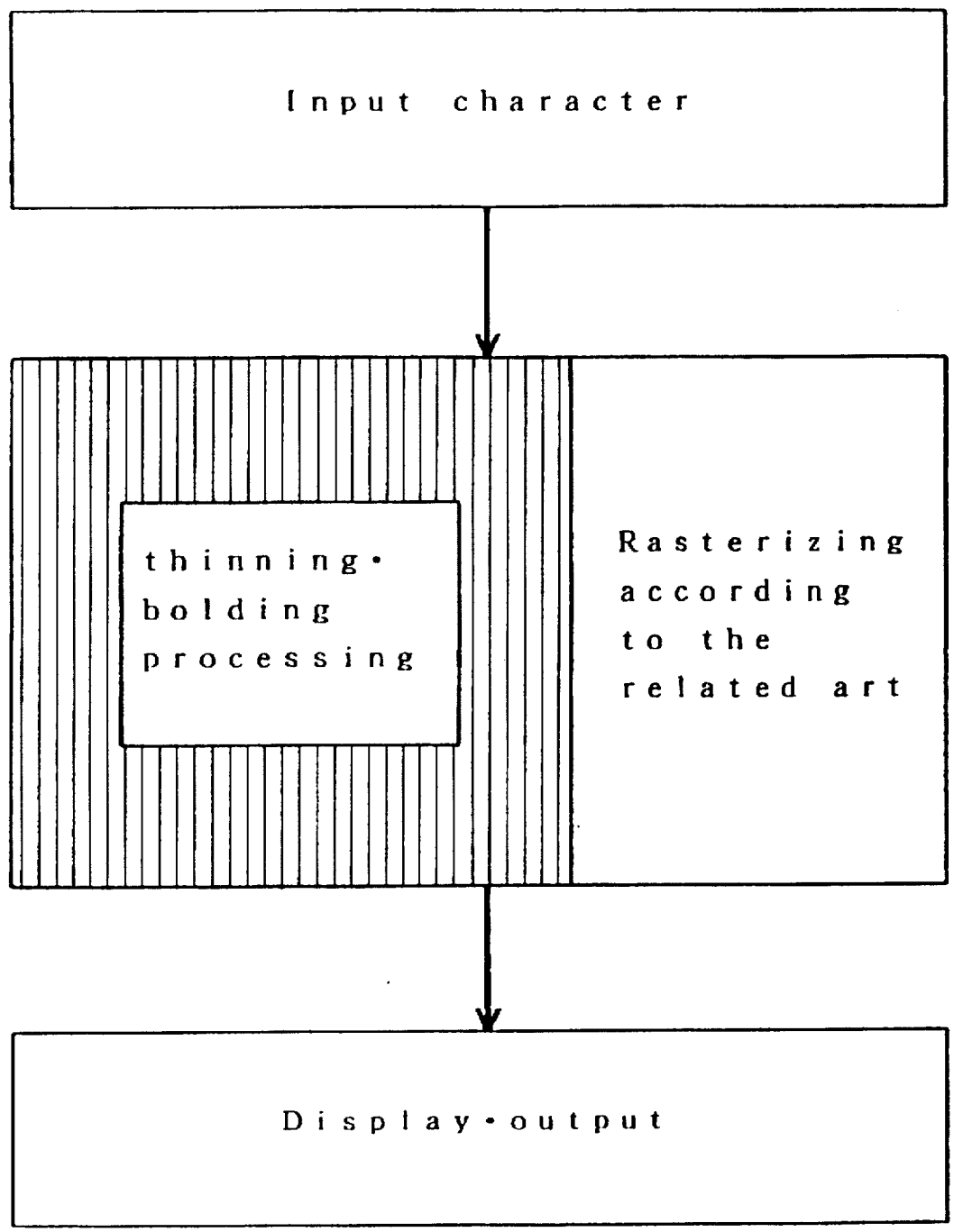
FIG. 24 explains a characteristic in an embodiment of this invention.

In embodiment 5, the font processor of embodiment 4, which performs both thinning processing and bolding processing, is realized without modifying the standard rasterizing process according the related art. It is illustrated in FIG. 24. Hereinafter, a line width of a character which is rasterized according to the related art is called a standard width.

Figure 25:
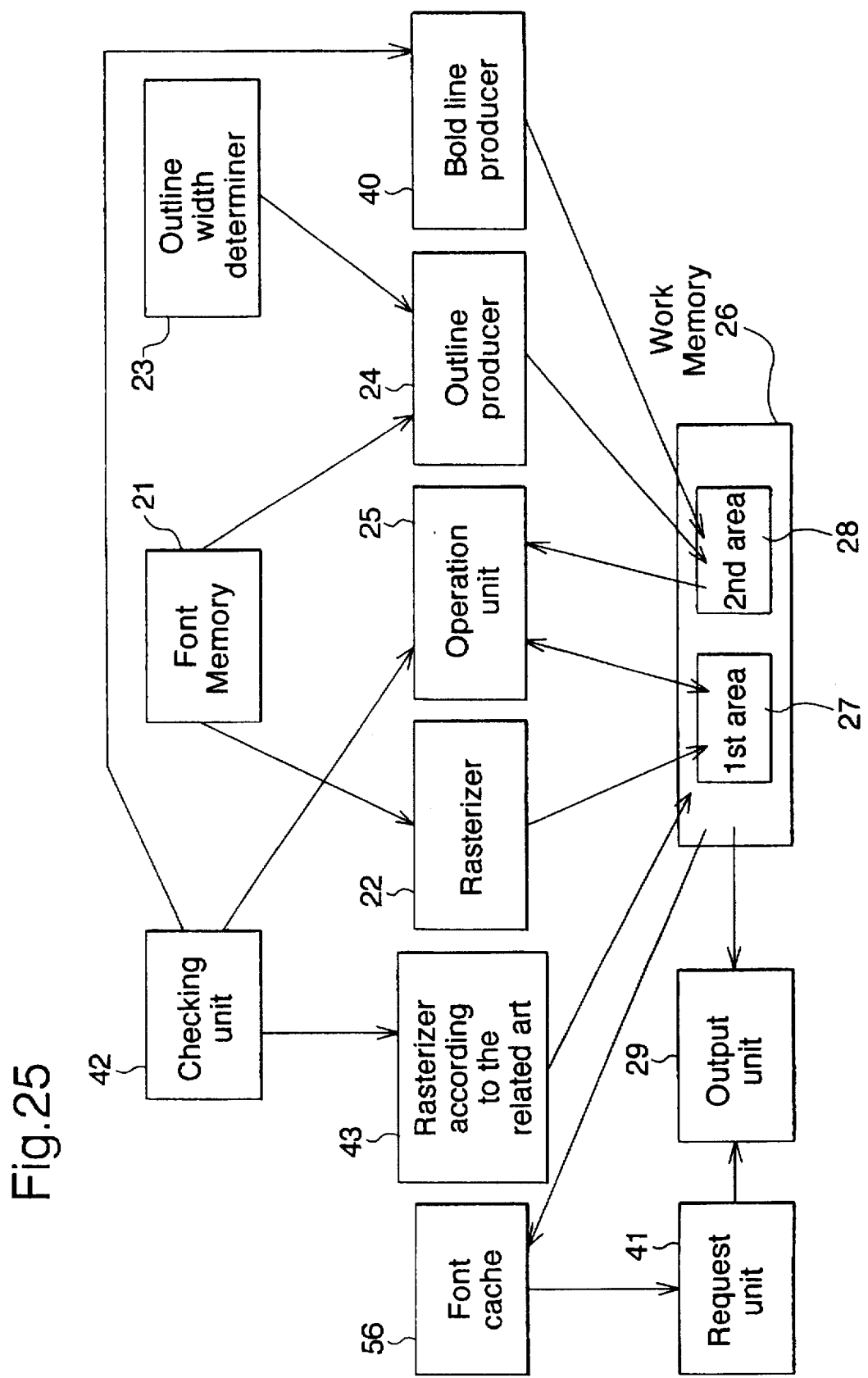
FIG. 25 is a block chart in an embodiment of this invention.
Figure 26:
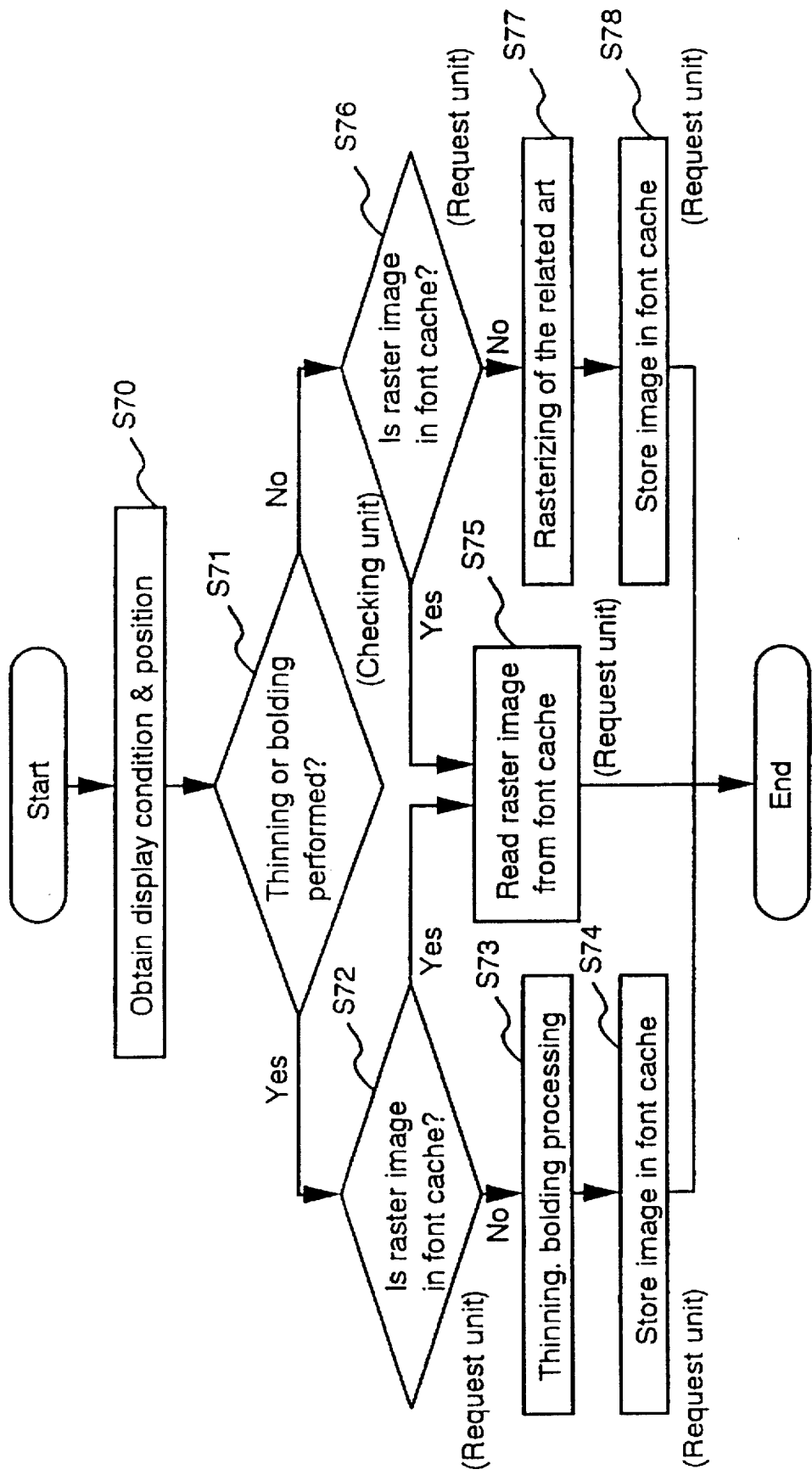
FIG. 26 shows a flow of processing in an embodiment of this invention.

FIG. 25 is a block chart of the font processor of embodiment 5. A judging unit 42 judges which processing should be performed in thinning processing, bolding processing and standard processing. A rasterizer 43 according to the related art is also shown in FIG. 26. Other elements which configure the block chart are same as in FIG. 21.

FIG. 26 is a flow chart of embodiment 5.

In step S70, a display condition and a display position are obtained. In step S71, the judging unit 42 judges if either thinning processing or bolding processing should be performed to optimize processing. After it is judged either thinning processing or bolding processing should be performed, the process goes to step 72. In step S72, the request unit 41 checks if a matching raster image is stored in the font cache 56. If the raster is stored in the font cache 56, the process goes to step S75. In step S75, the request unit 41 reads the raster image from the font cache 56, and the process ends.

If it is judged the matching raster image is not stored in the font cache 56 in step S72, the process goes to step S73. In step S73, thinning processing or bolding processing is performed. Thinning processing or bolding processing in this step can be any method of thinning and bolding which is stated in this specification. In step S74, the request unit 41 stores the raster image which is either thinned or bolded in the font cache 56, and the process ends.

If the judging unit judges that neither thinning or bolding is performed in step S71, the process goes to step S76. In step S76, the request unit 41 judges if the matching raster image is stored in the font cache 56. If the raster image is in the font cache 56, the process goes to step S75. In step S75, the request unit 41 reads the raster image from the font cache 56, and the process ends.

If the matching raster image is not stored in the font cache 56, the step goes to step S77, and a rasterizing process according to the related art is performed. In step S78, the request unit 41 stores the rasterized raster image in the font cache 56, and the process ends. This is the flow of processing in embodiment 5.

The judging unit may also judge according to the resolution of an output apparatus which outputs the characters, for example. In embodiment 5, if the resolution level of a device is below 300 dpi, thinning processing is performed. If the resolution level is above 1000 dpi, holding processing is performed This is shown in FIG. 27. According a hardware configuration which is illustrated in FIG. 3, if the characters are outputted to an output apparatus with a resolution level of below 300 dpi, such as the display unit 2c and the facsimile 4b, thinning processing may be performed. If the characters are outputted to an output apparatus with a resolution level of above 100 dpi, such as the printer 3a, bolding processing may be performed. If the characters are outputted to an output apparatus with other resolution levels, rasterizing according to the related art may be performed.

Besides the resolution level, the judging unit may make the judgement based on other criterions. It is also possible that the user assigns which processing is performed. For example, the user assigns the printer 3a to perform holding processing and the printer 3b to perform standard processing. Furthermore, when a display unit is used, modes such as a standard mode, silver mode, young mode, etc. may be provided. In the silver mode, the characters are magnified and slightly bolded. In the young mode, the characters are reduced in size and slightly thinned. When the user uses the display unit, if the user selects the silver mode, bolding processing is performed. It may also be defined that thinning processing is performed, if the user selects the young mode.

In embodiment 5, the font processor which has the judging unit is explained. The judging unit judges which processing is performed out of rasterizing according to the related art, thinning processing and bolding processing. In this method, the raster image according to the related art is able to be utilized, and the raster image is also able to be used for both thinning processing and bolding processing.

Embodiment 6.

Embodiment 6 relates to a font processor which makes judgement on which processing should be performed in thinning processing, bolding processing and processing with a standard width, and performs each of processing.

In embodiment 5, the raster image which was generated according to the related art was used for standard processing. However, in embodiment 6, the font processor performs thinning processing, bolding processing and standard processing without referring to the raster image according to the related art.

The block chart of the font processor in embodiment 6 is same with FIG. 25, a block chart of embodiment 5.

Figure 28:
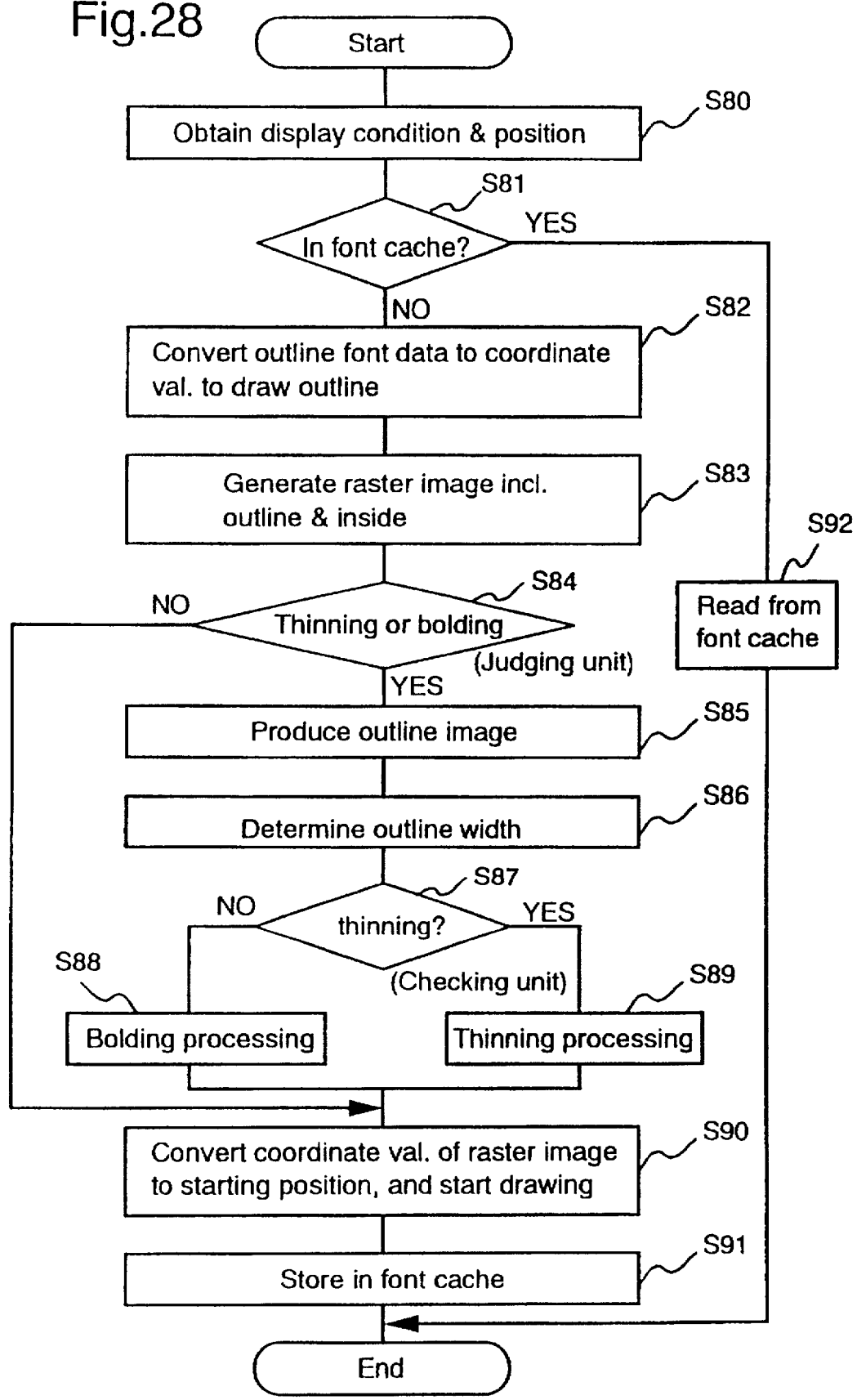
FIG. 28 shows a flow of thinning processing, bolding processing and processing in standard line width in an embodiment of this invention.

FIG. 28 shows a flow of processing of the font processor in embodiment 6. In the font processor, the judgement on thinning processing, bolding processing and standard processing is made, for example, based on the resolution level or some other criterion predefined by a user. In embodiment 6, the judgement may be made based on the resolution level as shown in FIG. 27. In step S80, the display condition and the display position are obtained. In step S81, the request unit 41 judges if the rasterized image is already stored in the font cache 56. If the image is stored in the font cache 56, the process goes to step S92. In step S92, the image is read from the font cache, and the process ends.

In step S81, if the image is not stored in the font cache 56, the process goes to step S82. In step S82, an outline font data is converted to an coordinate value to draw an outline. In step S82, steps S22–S25 in FIG. 5 are included. In step S83, a raster image, which includes the outline and an inside of the outline, is generated.

In step S84, the judging unit 42 judges either thinning processing or bolding processing should be performed. If a resolution level of a device which outputs the characters is, for example, either above 300 dpi or below 1000 dpi, the judgement is "NO." "NO" means that the standard width is selected. Then, the process goes to step S90. In step S90, the coordinate value of the raster image, which was generated in step S83, is converted to a position to start drawing, and drawing begins. In step S91, the request unit 41 stores the generated raster image in the font cache 56, and the process ends.

In step S84, if the resolution level is, for example, either less than 300 dpi or more than 1000 dpi, the judgement on thinning or bolding is "YES." Then, the process goes to step S85. In step S85, the outline producer 24 produces an outline image. In step S86, the outline width determiner 23 determines an outline width according to the condition of the characters which is inputted in step S80. This process is same as step S21 in FIG. 5.

In step S87, the judging unit 42 judges which is necessary out of thinning and bolding. If the resolution level is, for example, more than 1000 dpi, the judgement is "NO", and bolding processing is performed in step S88. Then, in step S90, a coordinate value of the bolded raster image is converted to a position to start drawing. In step S91, the raster image is stored in the font cache 56, and the process ends.

In step S87, if the resolution level is, for example, less than 300 dpi, the judgement on thinning is "YES", and the process goes to step S89. In step S89, thinning processing is performed, and the process goes to step S90. In step S90, a coordinate value of the thinned raster image is converted to a position to start drawing, and drawing starts. In step S91, the raster image is stored in the font cache 56, and the process ends.

The thinning or bolding method can be any method which is stated in this specification. This is the flow of processing according to the font processor of embodiment 6.

In embodiment 6, the font processor performs thinning processing, bolding processing and processing with a standard line width of the characters jointly.

Embodiment 7.

In embodiment 6, the judging unit judges which is suitable among thinning processing, bolding processing and standard processing. It is also possible that the judgement is made in two kinds of processing, e.g., thinning processing and standard processing. The judging unit may also judge from many kinds of processing in various widths, e.g., very thin, medium-thin, thin, standard, bold and very bold.

Embodiment 8.

In embodiment 8, another method of thinning processing is explained.

Figure 29:
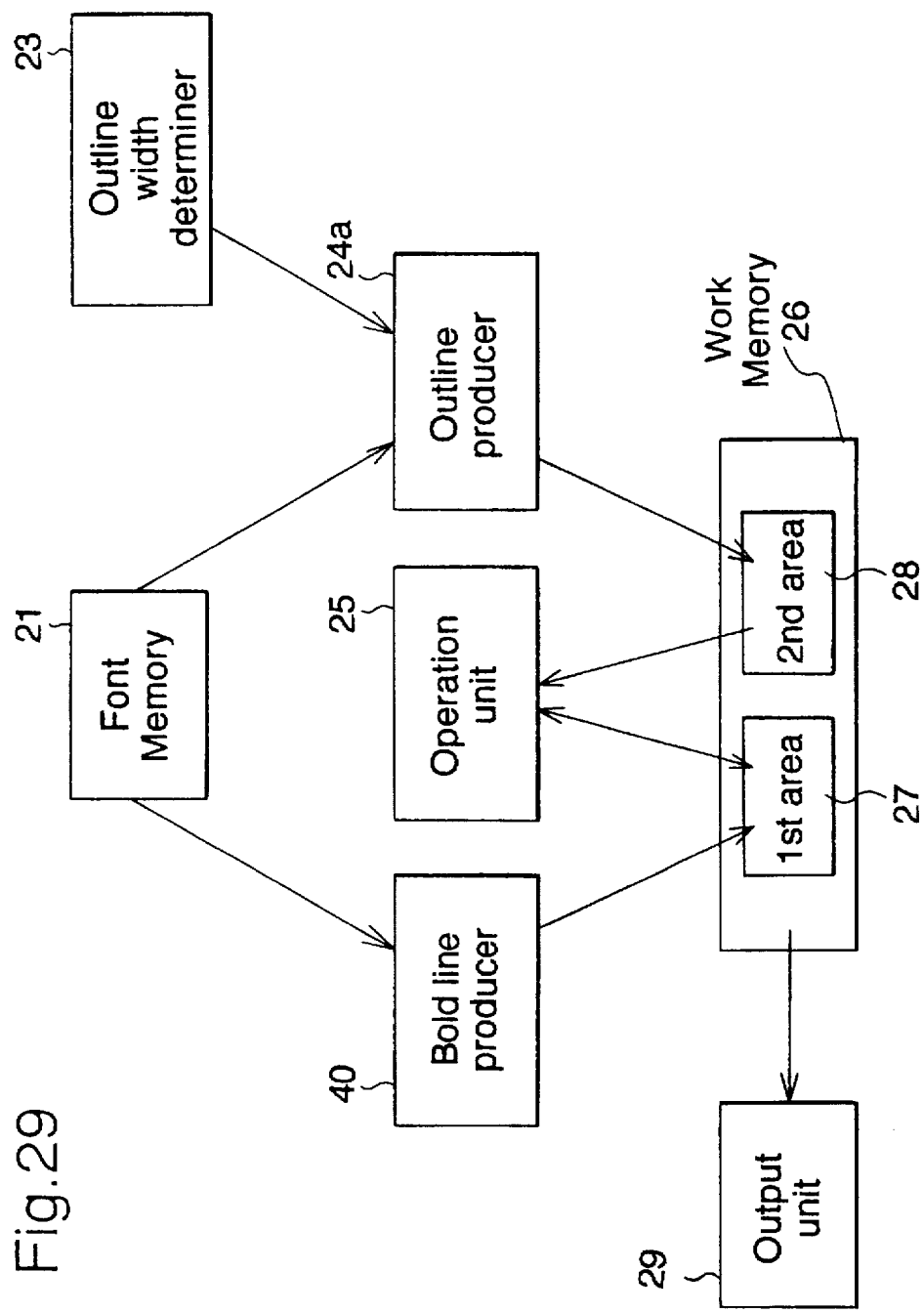
FIG. 29 is a block chart in an embodiment of this invention.

FIG. 29 is a block chart of the font processor of embodiment 8. In FIG. 29, the rasterizer 22 in FIG. 4 is replaced by the bold line producer 40. The bold line producer 40 generates a raster image which includes the outline image which is produced by the outline producer and the inside of the outline image. In addition to the function of the outline producer 24 in embodiment 7, outline producer 24a has a function to load the outline font information, and processes a coordinate value to draw an outline in a display size based on the vector data of the outline font.

In FIG. 30, a concept of thinning processing is explained with respect to embodiment 8. In FIG. 30, (a) shows a raster image which includes an outline image and the inside of the outline image. In FIG. 30, (b) shows the outline image. The outline producer 24a produces the outline image in the first area 27 and the second area 28 in the work memory 26. The outline producer 24a turns a black part in the outline image in (b) of FIG. 30 to "ON", and a white part in the outline image in (b) of FIG. 30 to "OFF." The bold line producer 40 turns the inside of the outline image of the first area to "ON." In this way, the raster image which is shown in (a) of FIG. 30 is generated.

The operation unit 25 tries to leave a part which is white in the second area and black in the first area. Then, the raster image which is shown in (c) of FIG. 30 is generated.

Figure 31:
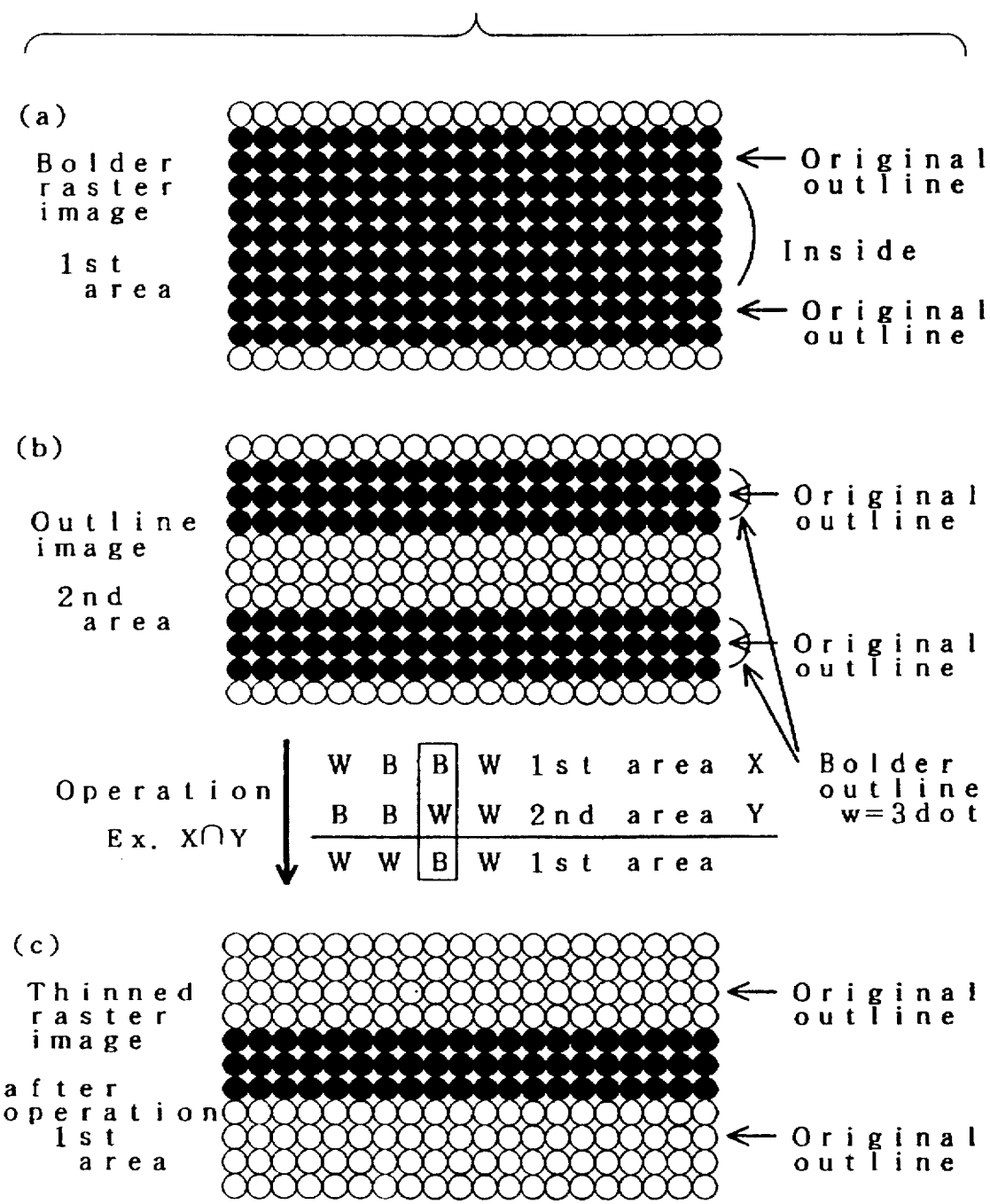
FIG. 31 illustrates a detailed explanatory figure on thinning processing in an embodiment of this invention.

In FIG. 31, a part of each of the raster image which includes the outline image and the inside of the outline image, the outline image and the thinned raster image is magnified and shown in dot patterns.

In FIG. 31, when the white part is described with a value of "OFF" and the black part is described with a value of "ON", the raster image in (a) of FIG. 31 is X and the outline image in (b) of FIG. 31 is Y. For example, the thinned raster image in (c) of FIG. 31 is generated by a conjunction of X and a reversed Y.

Figure 32:
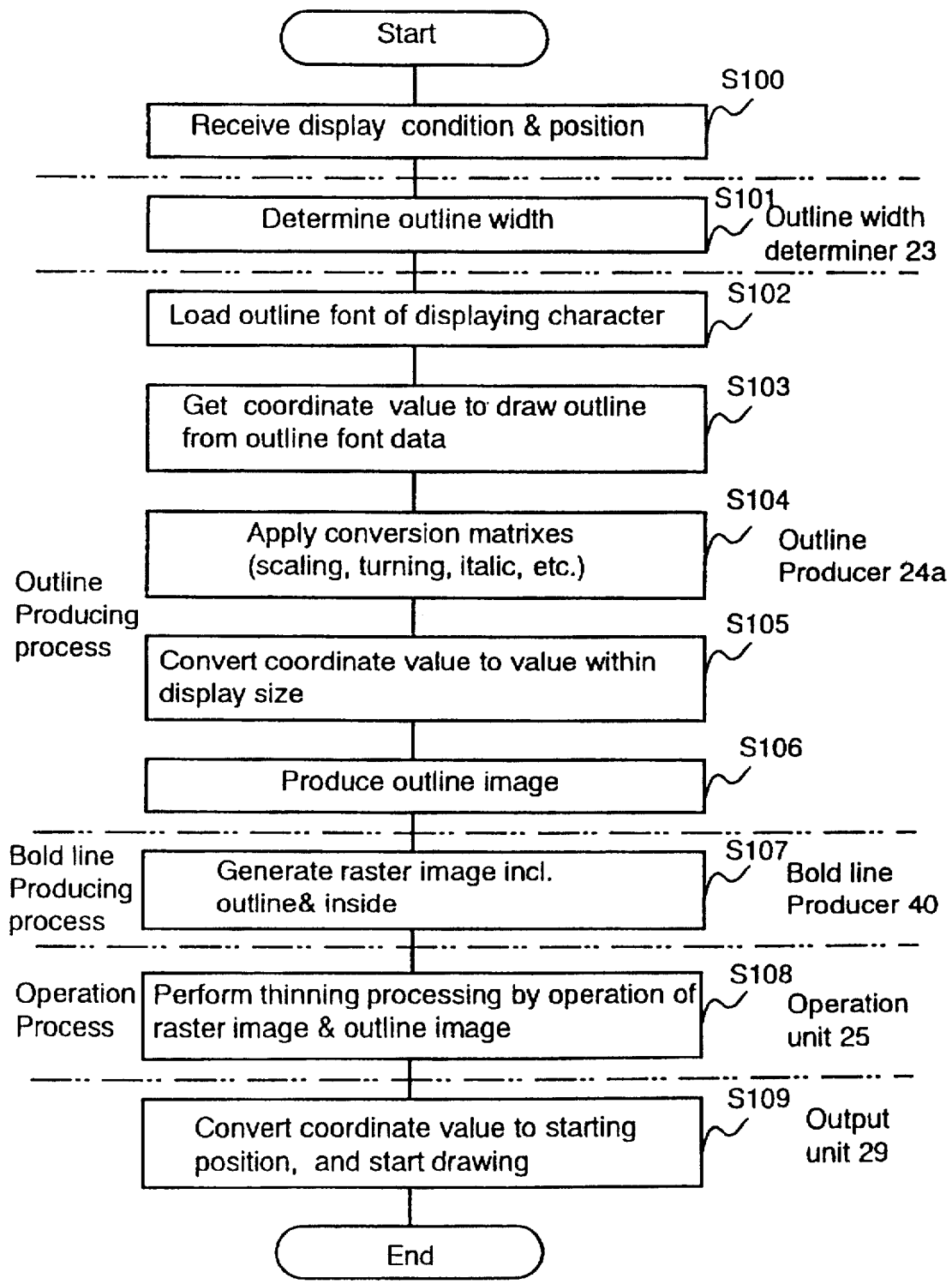
FIG. 32 shows a flow of thinning processing in an embodiment of this invention.

In FIG. 32, a flow of thinning processing in embodiment 8 is shown. Steps S100–S105 in FIG. 32 are same with steps S20–S25 in FIG. 5. Steps S102–S106 in FIG. 32 are performed by the outline producer 24a. In step S106, the outline producer 24a produces the outline image. In step S107, the bold line producer 40 generates a raster image which includes the outline image and the inside of the outline image. In step S108, the operation unit 25 performs thinning processing by a logical operation of the raster image and the outline image. In this logical operation, X and Y are used. For example, thinning processing is performed by a logical conjunction of X and the reversed Y. In step S109, the output unit 29 converts the coordinate value of the thinned raster image to a position to start drawing, and starts drawing Then the process ends. This is the flow of thinning processing of embodiment 8.

In FIG. 32, steps S102–S106 are the process of producing the outline. Step S107 is the bold line producing process, and step S108 is the operation process.

In the font processor of embodiment 8, the raster image which includes the outline image and the inside of the raster image is generated, and the thinned raster image is generated by excluding the outline image from the raster image. The bold line producer 40 may also rasterize the inside of the outline image in a different pattern or color from the outline image.

Embodiment 9.

In embodiment 9, another method of thinning processing is explained.

Figure 33:
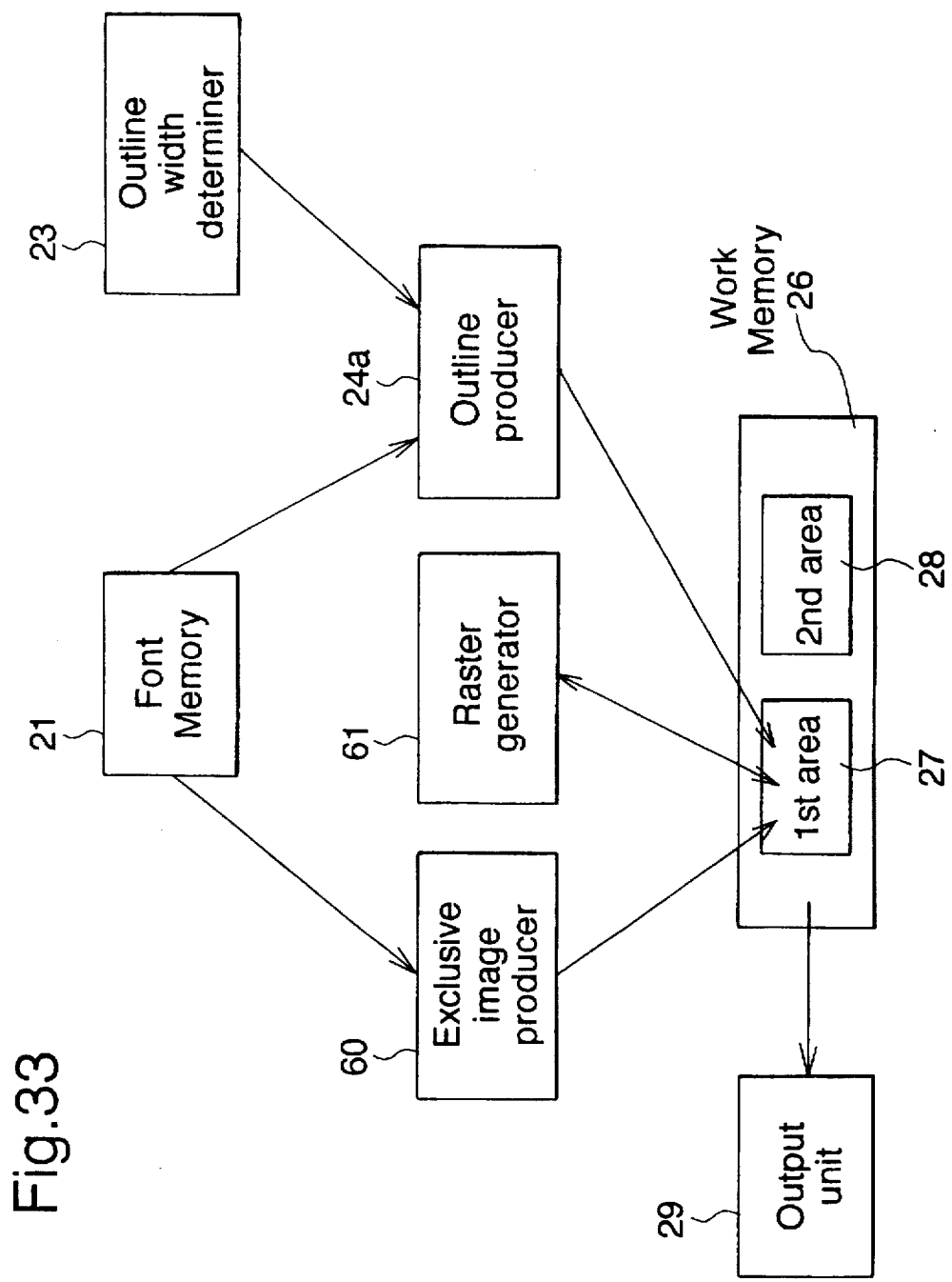
FIG. 33 is a block chart in an embodiment of this invention.

FIG. 33 is a block chart of a font processor of embodiment 9. In FIG. 33, an exclusive image producer 60 produces an image which includes the outline image, which is produced by the outline producer 24a, and an outside of the outline image. In embodiment 9, a raster generator 61 generates a thinned raster image by reversing "ON" and "OFF" of the image, which is generated by the exclusive image producer.

Figure 34:
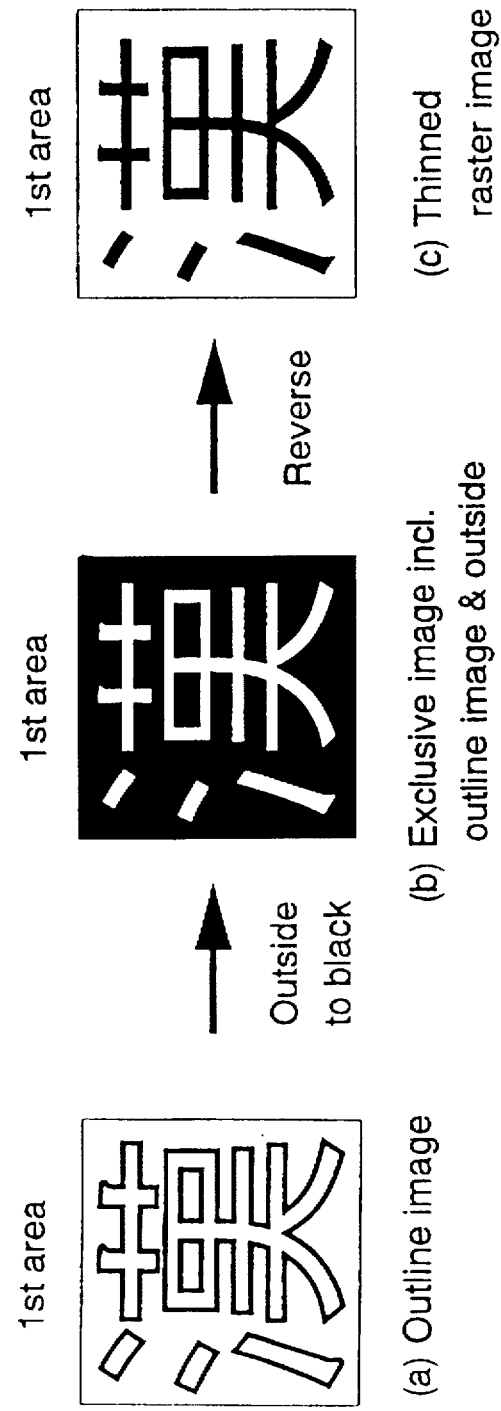
FIG. 34 illustrates a concept of thinning processing in an embodiment of this invention.

In FIG. 34, a concept of thinning processing of embodiment 9 is shown. In (a) of FIG. 34, an outline image is shown. The outline producer 24a produces the outline image in the first area 27 in the work memory 26. The outline image is produces by turning a black part to "ON" and a white part to "OFF." The exclusive image producer 60 produces an exclusive image in (b) of FIG. 34 by turning the outline image and the outside of the image to "ON" in the first area 27. The raster generator 61 reverses "ON" and "OFF" of the produced exclusive image, and generates the thinned raster image as shown in (c) of FIG. 34.

Figure 35:
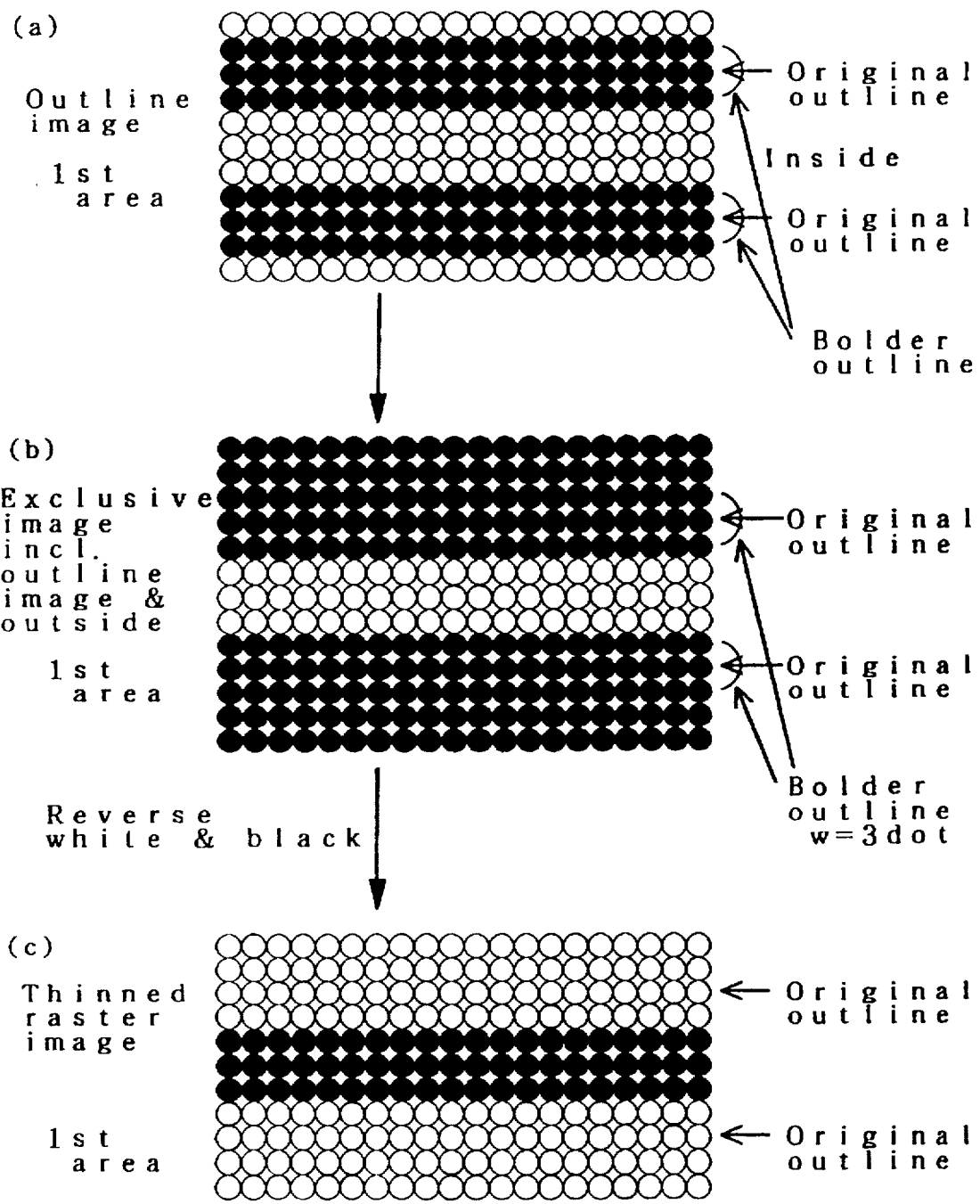
FIG. 35 illustrates a detailed explanatory figure on thinning processing in an embodiment of this invention.

In FIG. 35, each of the images which are shown in FIG. 34 is magnified and shown in a dot image. In FIG. 35, (a) is the outline image. In FIG. 35, (b) is the exclusive image which includes the outline image and the outside of the outline. In FIG. 35, (c) is the thinned raster image which is generated by reversing the white dot pattern and the black dot pattern in (b) of FIG. 35.

Figure 36:
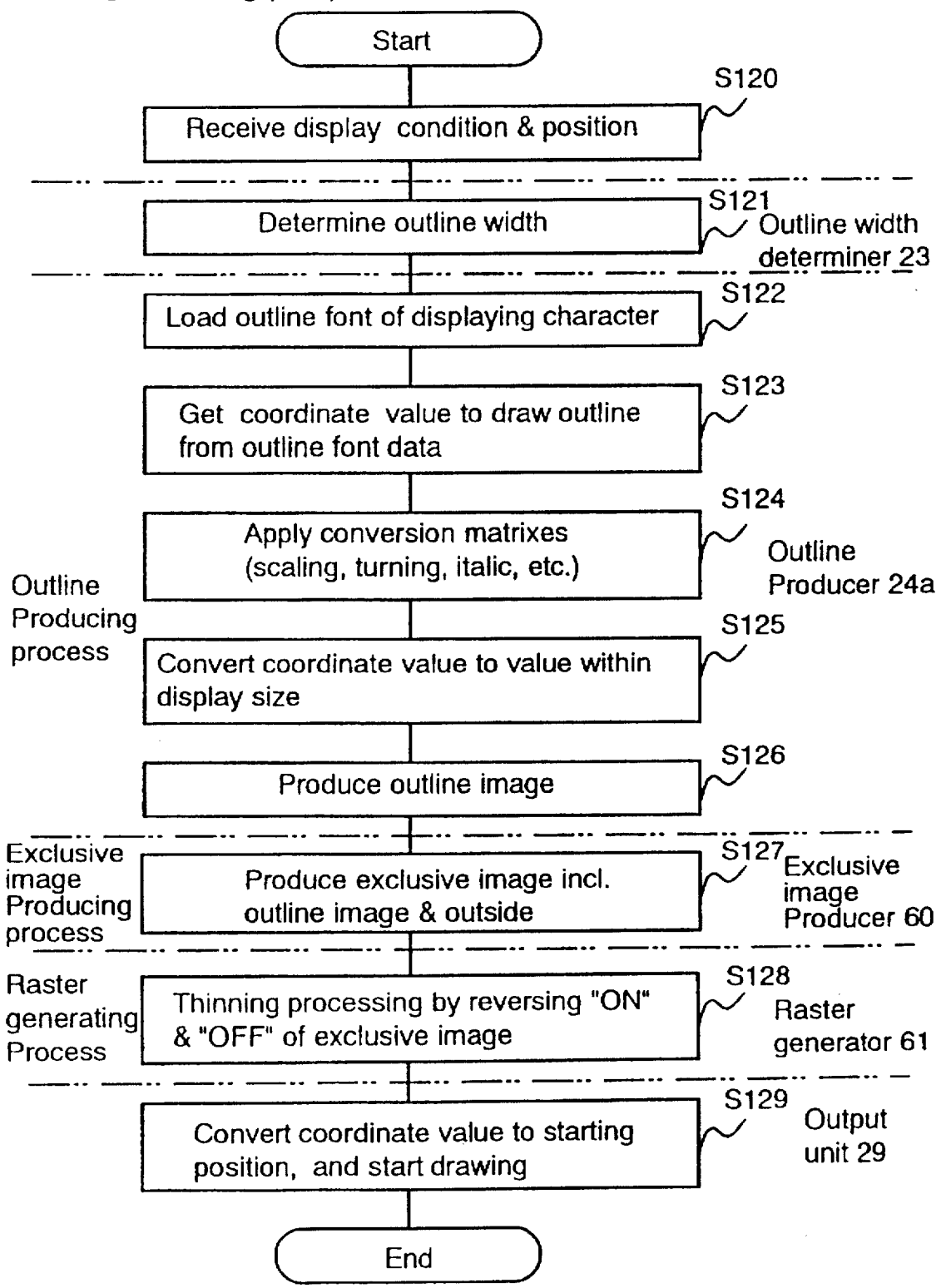
FIG. 36 shows a flow of thinning processing in an embodiment of this invention.

FIG. 36 is a flow chart of thinning processing of embodiment 9. In steps S120–S126, a condition of characters and a display position are obtained, an outline width is determined, and an outline image is produced according to the outline font. Steps S120–S126 in FIG. 36 are same with steps S100–S106 in FIG. 32. In step S127, the exclusive image producer 60 produces an exclusive image by turning an image which includes the outline image and the outside of the outline to "ON." The raster generator 61 generates a thinned raster image by reversing "ON" and "OFF" of the exclusive image. In step S129, a coordinate value of the thinned raster image is converted to a position to start drawing, and drawing is started.

Steps S122–S126 are the process of producing an outline. Step S127 is a process of producing an exclusive image. Step S128 is a process of rasterizing a thinned raster image by reversing "ON" and "OFF" of the exclusive image.

In embodiment 9, another method of thinning processing was explained.

The font processor of embodiment 9 is characterized by having the following characteristic elements:

(a) a font memory to store the outline font, (b) an outline width determiner to determine an outline width of the outline which is produced according to the outline font, (c) an outline producer which produces an outline image based on the outline, which is produced according to the outline font, and the outline width, which is determined by the outline width determiner, (d) an exclusive image producer which produces an image including the outline image which is produced by the outline producer and the outside of the outline image, (e) a raster generator which generates a raster image by reversing "ON" and "OFF" of the image which is produced by the exclusive image producer and described in data of two values of "ON" and "OFF", and (f) an output unit which outputs the raster image which is generated by the raster generator.

Embodiment 10.

In embodiment 10, a third method of thinning processing is explained.

Figure 37:
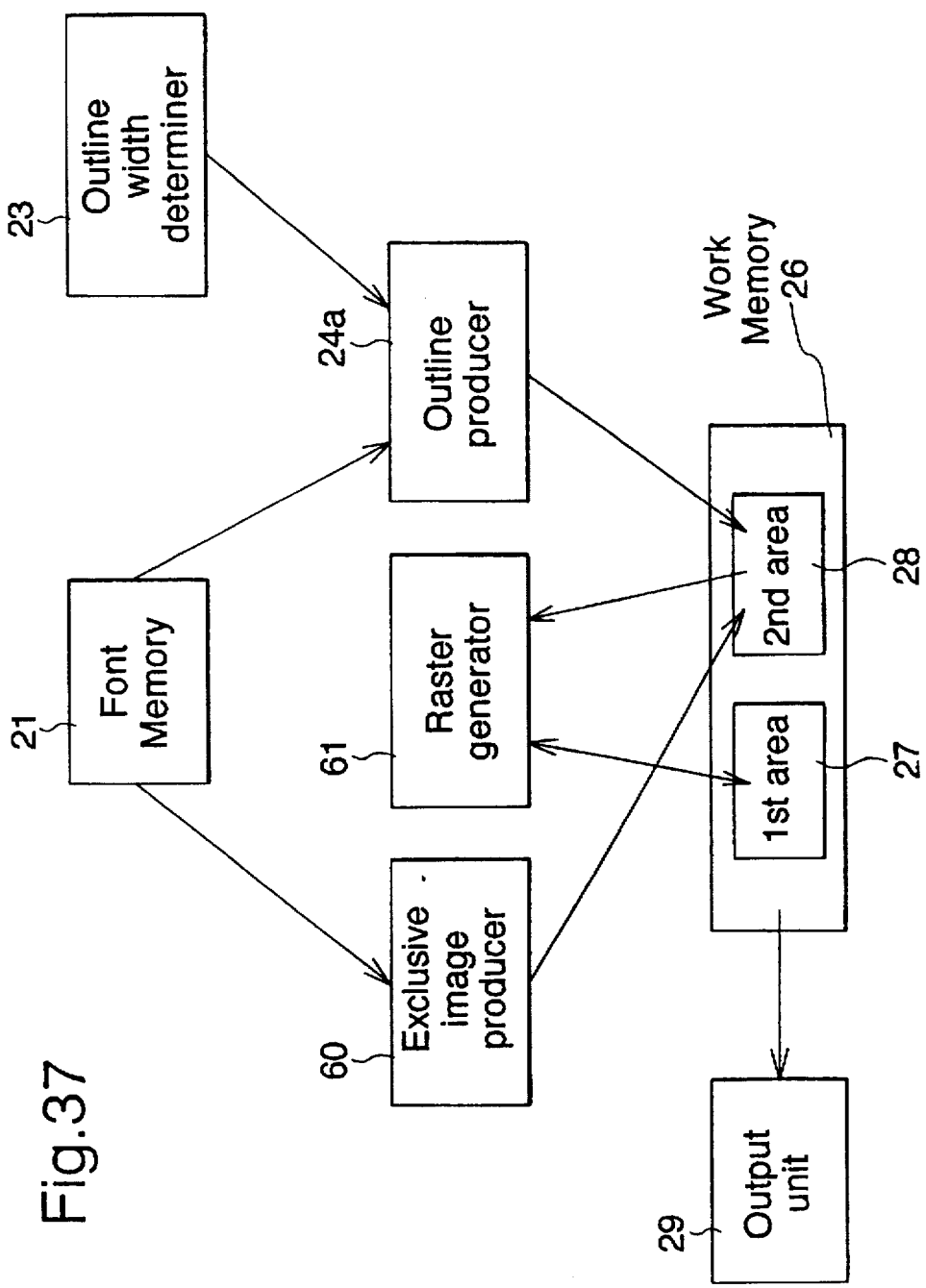
FIG. 37 is a block chart in an embodiment of this invention.

FIG. 37 is a block chart of a font processor of embodiment 10. In FIG. 37, the outline producer 24a and the exclusive image producer 60 produce an image in the second area 28. Other elements in FIG. 37 are same with the elements in FIG. 33 of embodiment 9.

Figure 38:
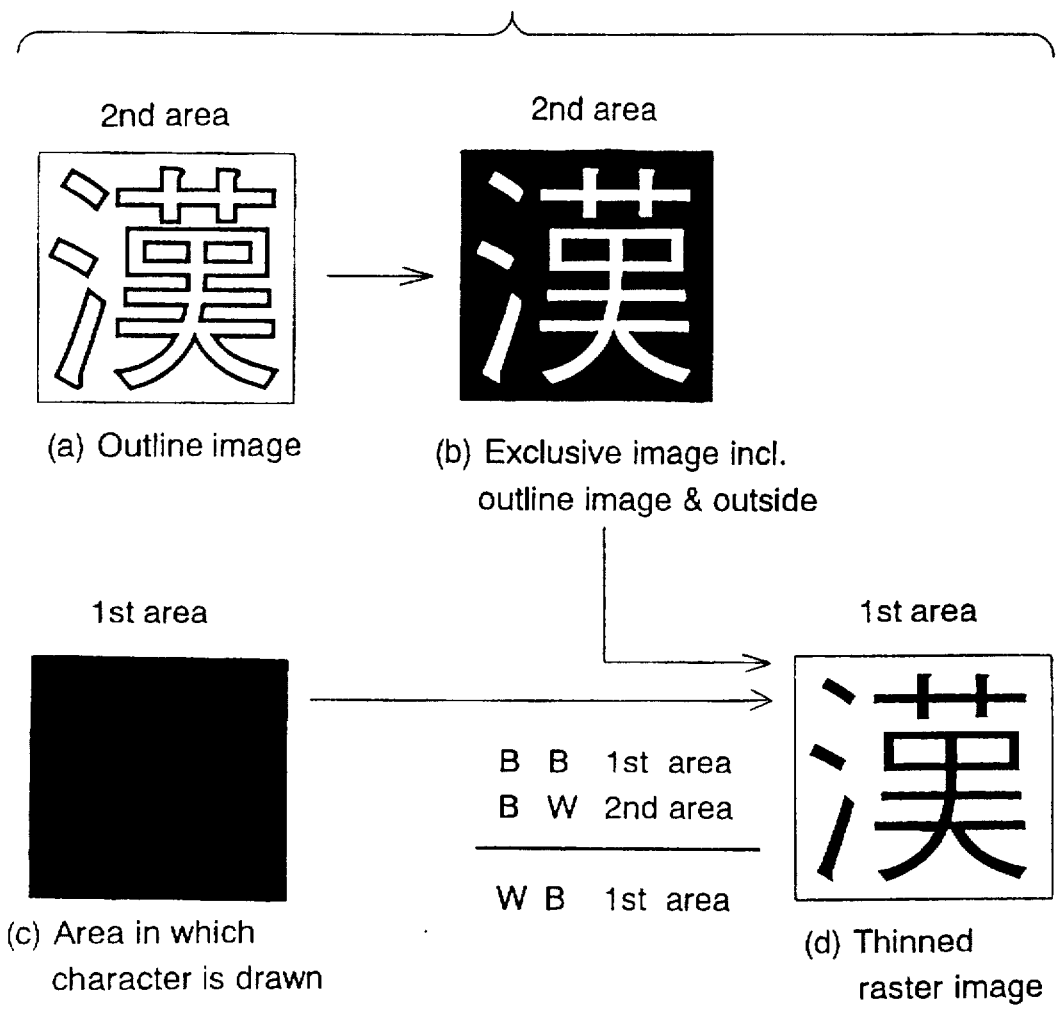
FIG. 38 illustrates a concept of thinning processing in an embodiment of this invention.

A concept of embodiment 10 is shown in FIG. 38. In FIG. 38, the outline producer 24a produces an outline image in the second area 28 in the work memory 26.

The exclusive image producer 60 produces an exclusive image which includes the outline image, which is produced by the outline producer 24a, and the outside of the outline image. The exclusive image producer 60 turns the area which includes the outline image and the outside of the outline image to "ON", and produces an exclusive image which is shown in (b) of FIG. 38 in the second area 28.

The raster generator 61 assigns an area which is slightly more than a character size in the first area 27, and turns an inside of the area to "ON." In (c) of FIG. 38, it is shown in black. Then, the raster generator 61 turns an area which is "ON" in the exclusive image in the second area and "ON" in the first area where the character is drawn to "OFF." The raster generator 61 also turns an area which is "ON" in the exclusive image in the second area and "OFF" in the first area where the character is drawn to "ON." In this way, a thinned raster image is generated.

Figure 39:
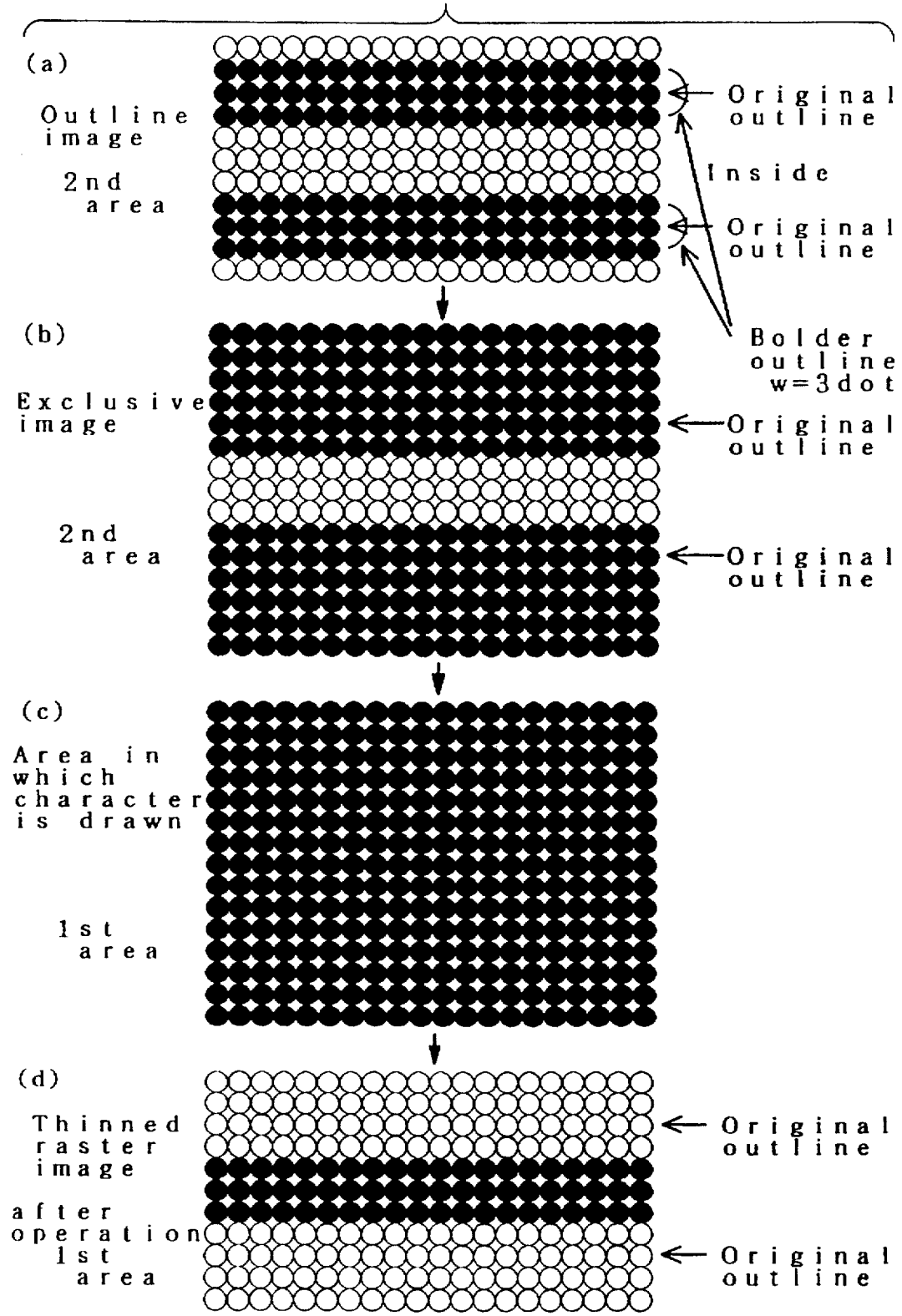
FIG. 39 illustrates a detailed explanatory figure on thinning processing in an embodiment of this invention.

In FIG. 38, an area which is black in the exclusive image as shown in (b) of FIG. 39 and black in the area where the character is drawn in (c) of FIG. 39 is turned to white. An area which is black in (b) of FIG. 38 and white in (c) of FIG. 38 is turned to black. In this way, a thinned raster image is generated as shown in (d) of FIG. 38. In FIG. 39, each of images in FIG. 38 is magnified and shown in a dot image.

Figure 40:
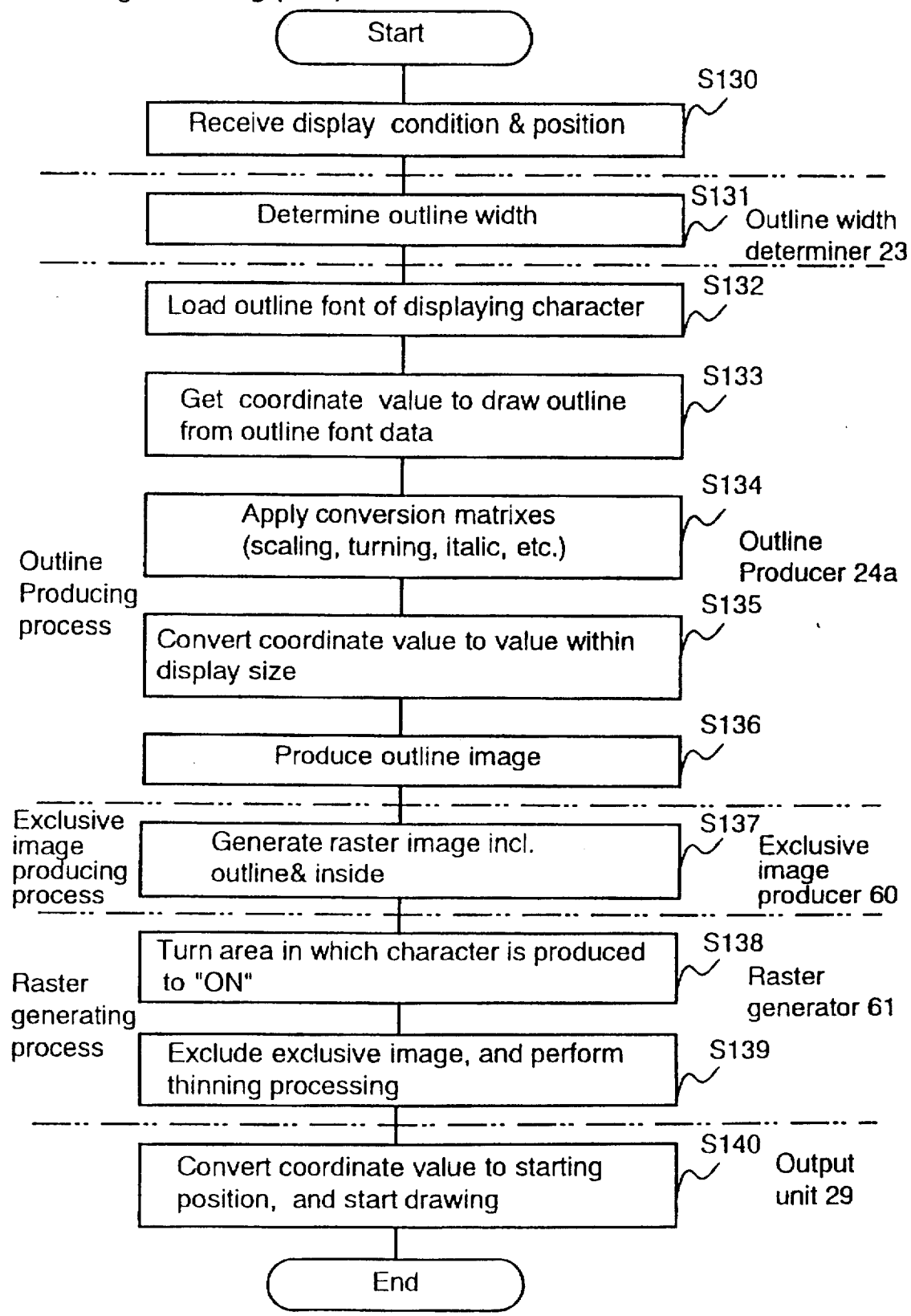
FIG. 40 shows a flow of thinning processing in an embodiment of this invention.

FIG. 40 is a flow chart of thinning processing of embodiment 10.

Steps S130–S137 in FIG. 40 are same as steps S120–S127 in FIG. 36. In step S137, an exclusive image is produced. In step S138, the raster generator 61 turns an area, in which a character is to be produced, to "ON." In step S139, the raster generator 61 generates a thinned raster image by making an operation of an exclusive disjunction of the area, in which a character is produced, and an exclusive image, for example. Steps S138 and S139 are a rasterizing process, which are a characteristic process of thinning processing in embodiment 10.

In embodiment 10, the third method of thinning processing was explained.

The font processor of embodiment 10 is characterized by having the following characteristic elements:

(a) the font memory 21 to store the outline font, (b) the outline width producer to determine the outline width of the outline which is produced according to the outline font (c) the outline producer which produces the outline image based on the outline which is produced according to the outline font and the outline width which is determined by the outline width determiner, (d) the exclusive image producer which produces the image including the outline image which is produced by the outline producer and the outside of the outline image, (e) a raster generator which predefines that an image is displayed in an area which is assigned to generate an image and predefines that an exclusive image which is produced by the exclusive image producer is not displayed, and (f) the output unit which outputs the raster image which is generated by the raster generator.

Embodiment 11.

In embodiment 11, a fourth method of thinning processing is explained.

Figure 41:
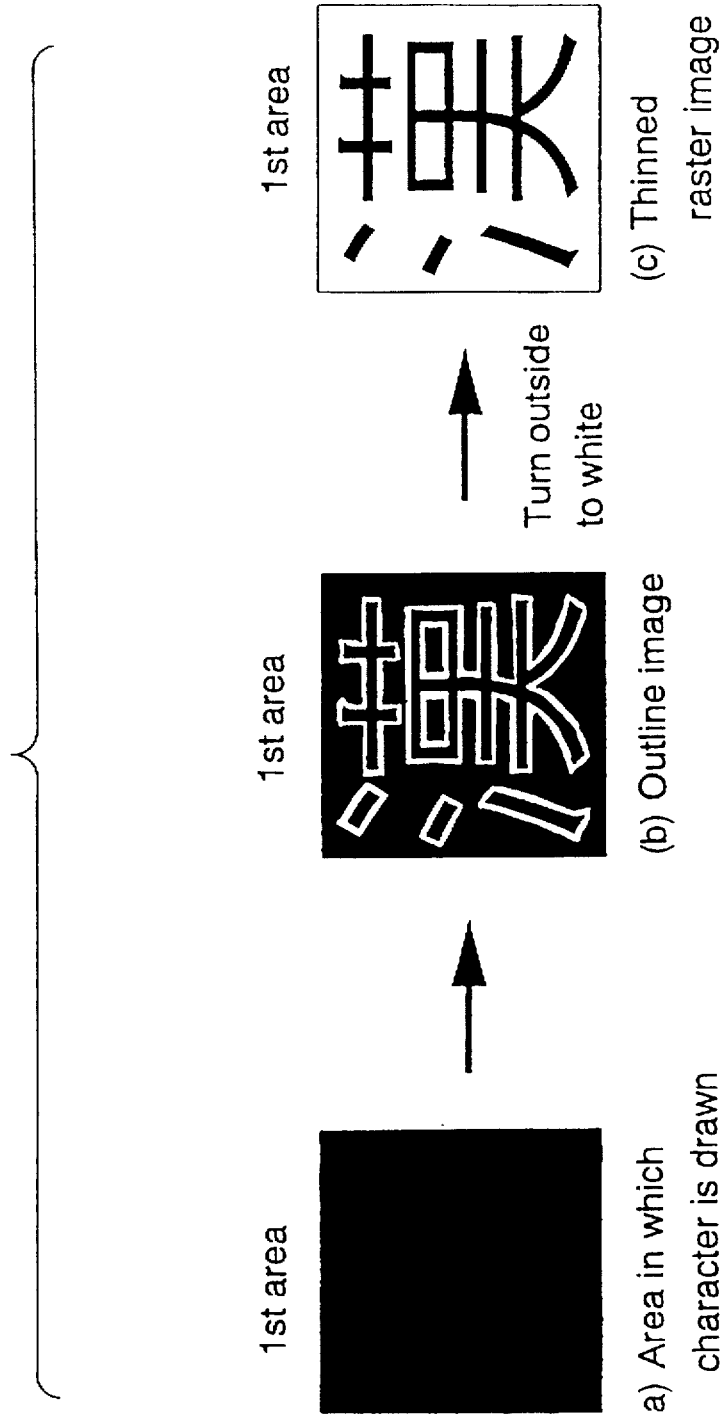
FIG. 41 illustrates a concept of thinning processing in an embodiment of this invention.

A block chart of embodiment 11 is same as FIG. 33. A concept of embodiment 11 is shown in FIG. 41. The raster generator 61 assigns an area which is slightly more than a character size in the first area 27, and turns an inside of the area to "ON." This area is called as an area where a character is drawn. In (a) of FIG. 41, this area is shown in black.

Then, the outline producer 24a produces an outline image in "OFF" in the area where a character is drawn in the first area 27, as shown in (b) of FIG. 41. The exclusive image producer 60 turns the outside of the outline image to "OFF", and generates a thinned raster image as shown in (c) of FIG. 41.

In embodiment 11, "ON" and "OFF" are reversed compared with the thinning processing method of embodiment 9. In embodiment 9, the excluding image is produced as "ON" in an "OFF" area, and "ON" and "OFF" are reversed at the end to generate the thinned raster image. In embodiment 11, the thinned raster image is generated by turning the excluding image to "OFF" in an "ON" area.

Embodiment 12.

In embodiment 11, a kanji character was used. However, the font processing method is also applicable to other characters, such as Hiragana, Katakana, alphabet, number, Greek, Arabic, Hungle. etc. Besides such characters, it is also possible to apply to a symbol like a triangle, circle, square, etc. It may also apply to any icon. When an image which is defined with a vector data is outputted, an aforementioned method may be applied.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is limited only as defined in the following claims and the equivalents thereto.

What is claimed is:

1. A font processor comprising:

a font memory for storing outline font information;

a width indicator for indicating a width in pixels of lines forming an outline;

an outline producer, coupled to the font memory and the width indicator, for producing an outline image according to the outline font information, having lines defined by the width indicator;

a font generator, coupled to the outline producer, for generating a font image based on the outline image; and output means, coupled to the font generator, for outputting the font image.

2. A font processor comprising:

a font memory for storing outline font information;

a rasterizer, coupled to the font memory, for producing an outline according to the outline font information and for converting the outline to a raster image which includes the outline and an inside area of the outline;

a width indicator for indicating a width in pixels of lines forming an outline;

an outline producer, coupled to the width indicator, for producing an outline image according to the outline font information, having lines defined by the width indicator;

a processing unit, coupled to the outline producer and the rasterizer, for processing the raster image with the outline image so as to modify the raster image to create a modified raster image; and output means, coupled to the processing unit, for outputting the modified raster image.

3. A font processor comprising:

a font memory for storing outline font information;

a width indicator for indicating a width in pixels of lines forming an outline;

an outline producer, coupled to the font memory and the width indicator, for producing an outline image according to the outline font information, having lines defined by the width indicator;

a bold line producer, coupled to the outline producer, for producing a raster image based on the outline image, the raster image including the outline image and an inside area of the outline image;

a processing unit processing the raster image with the outline image so as to modify the raster image to create a modified raster image; and output means, coupled to the processing unit, for outputting the modified raster image.

4. A font processor comprising:

a font memory for storing outline font information;

a width indicator for indicating a width in pixels of lines forming an outline;

an outline producer, coupled to the font memory and the width indicator, for producing an outline image according to the outline font information, having lines defined by the width indicator;

an exclusive image producer, coupled to the outline producer, for processing an exclusive image which includes the outline image and an outside area of the outline;

a rasterizer, coupled to the exclusive image producer, for excluding the exclusive image from a predefined area so as to produce a raster image; and output means, coupled to the rasterizer, for outputting the raster image produced by the rasterizer.

5. A font processor comprising:

a font memory for storing outline font information;

a width indicator for indicating a width in pixels of lines forming an outline;

an outline producer, coupled to the font memory and the width indicator, for producing an outline image according to the outline font information, having lines defined by the width indicator;

a bold line producer, coupled to the outline producer, for producing a raster image based on the outline image, the raster image including the outline image and an inside area of the outline image; and output means, coupled to the bold line producer, for outputting the raster image produced by the bold line producer.

6. The font processor of claim 2, wherein the raster image and the outline image are each formed with a plurality of elements, each of the plurality of elements being represented by a binary element signal of ON and OFF, wherein the processing unit selects an element of the modified raster image when an element of the outline image is OFF and a corresponding element of the raster image is ON.

7. The font processor of claim 2, wherein the raster image and the outline image are formed with a plurality of elements, each of the plurality of elements being represented by a binary element signal of ON and OFF, wherein the processing unit selects an element of the modified raster image when at least one of an element of the raster image and a corresponding element of the outline image is ON.

8. The font processor of claim 1, wherein the outline producer produces an outline image for a font based on a plurality of outlines, and wherein the outline producer deletes an overlapped area created by an overlap among the plurality of outlines.

9. The font processor of claim 1, further comprising an output unit, coupled to the output means, the output unit having a predefined output resolution, wherein the width indicator determines the line width based on the predefined output resolution.

10. The font processor of claim 1, further comprising an output unit, coupled to the output means, the output unit having a predefined size of an output area, wherein the width indicator determines the line width based on the predefined size of the output area.

11. The font processor of claim 1, wherein the outline font information includes a plurality of font types, wherein the width indicator determines the line width based on each of the font types.

12. The font processor of claim 1, wherein the outline font information includes a plurality of character types, wherein the width indicator determines the line width based on each of the character types.

13. The font processor of claim 1, wherein the width indicator determines the line width based on a received value.

14. The font processor of claim 2, wherein the rasterizer uses a first pattern for rasterizing the outline and a second pattern that is different from the first pattern for the inside area of the outline.

15. The font processor of claim 3, wherein the bold line producer uses different patterns for rasterizing the outline and the inside area of the outline.

16. The font processor of claim 1, wherein the raster image includes a line with a thickness, the font processor further comprising a decision unit for determining the thickness of the line according to a predefined criterion.

17. The font processor of claim 16, wherein the decision unit uses an output resolution as the predefined criterion.

18. The font processor of claim 16, wherein the decision unit uses a received value as the predefined criterion.

19. The font processor of claim 1, further comprising an image store memory for storing the font image outputted by the output means, and a utilization unit for checking whether the font image is stored in the image store memory and for reading the font image from the image store memory when the raster image is stored therein.

20. A font processing method for creating a modified raster image, comprising the steps of:

producing an outline based on outline font information and rasterizing the outline and an inside area of the outline to produce a raster image;

producing an outline image formed by lines, the lines having a width in pixels that is based on the outline font information; and modifying the raster image with the outline image by performing a predefined operation, to create the modified raster image.

21. A font processing method, for creating a modified raster image, comprising the steps of:

producing an outline image formed by lines, the lines having a width in pixels that is based on outline font information that is associated with the outline image;

producing a raster image from the outline image and an inside area of the outline image; and modifying the raster image with the outline image by performing a predefined operation to create the modified raster image.

22. A font processing method, for producing a raster image, comprising the steps of:

producing an outline image formed by lines, the lines having a width in pixels that is based on outline font information that is associated with the outline image;

producing an image that represents an exclusive logical combination of pixels of the outline image and pixels of an outside area of the outline image; and producing the raster image by eliminating the exclusive image for a predefined area.

23. The font processing method of claim 20, further including the step of determining the outline width.

24. The font processing method of claim 23, wherein the step of determining the outline width includes determining the outline width based on at least one of a display size, a typeface, and a character type.

25. The font processing method of claim 20, further including the step of receiving outline width data indicative of a desired outline width, and wherein the step of determining the outline width includes determining the outline width based on the received outline width data.

26. The font processing method of claim 20, wherein the step of modifying the raster image includes determining a difference between the raster image and an inverse of the outline image.

27. The font processing method of claim 20, wherein the step of modifying the raster image includes determining a sum of the raster image and the outline image.

28. The font processing method of claim 20, further including the step of determining a resolution of an output device, and wherein the predefined operation is determined based on the resolution of the output device.

29. The font processing method of claim 21, further including the step of determining the outline width.

30. The font processing method of claim 29, wherein the step of determining the outline width includes determining the outline width based on at least one of a display size, a typeface, and a character type.

31. The font processing method of claim 21, further including the step of receiving outline width data indicative of a desired outline width, and wherein the step of determining the outline width includes determining the outline width based on the received outline width data.

32. The font processing method of claim 21, wherein the step of modifying the raster image includes determining a difference between the raster image and an inverse of the outline image.

33. The font processing method of claim 21, wherein the step of modifying the raster image includes determining a sum of the raster image and the outline image.

34. The font processing method of claim 21, further including the step of determining a resolution of an output device, and wherein the predefined operation is determined based on the resolution of the output device.

35. The font processing method of claim 22, further including the step of determining the outline width.

36. The font processing method of claim 35, wherein the step of determining the outline width includes determining the outline width based on at least one of a display size, a typeface, and a character type.

37. The font processing method of claim 22, further including the step of receiving outline width data indicative of a desired outline width, and wherein the step of determining the outline width includes determining the outline width based on the received outline width data.

38. The font processing method of claim 22, further including the step of determining a resolution of an output device, and wherein the predefined operation is determined based on the resolution of the output device.

* * * * *